United States Patent [19]
Morduch et al.

[11] Patent Number: 5,670,957
[45] Date of Patent: Sep. 23, 1997

[54] METHODS FOR COMMUNICATING WITH A TELECOMMUNICATIONS DEVICE FOR THE DEAF

[75] Inventors: Georg E. Morduch, Alexandria, Va.; Joe J. Lynn, Gaithersburg, Md.

[73] Assignee: Microlog Corporation, Germantown, Md.

[21] Appl. No.: 479,192

[22] Filed: Jun. 7, 1995

Related U.S. Application Data

[62] Division of Ser. No. 308,344, Sep. 19, 1994, Pat. No. 5,499,285, which is a continuation of Ser. No. 790,257, Nov. 12, 1991, Pat. No. 5,388,146.

[51] Int. Cl.$^6$ ................................................ H03M 7/00
[52] U.S. Cl. ................................................ 341/91
[58] Field of Search ................ 341/91, 106, 55, 341/51, 144

[56] References Cited

U.S. PATENT DOCUMENTS

| | | | |
|---|---|---|---|
| 3,153,121 | 10/1964 | Crabtree et al. | 179/6 |
| 3,199,226 | 8/1965 | Joslow | 35/35 |
| 3,507,997 | 4/1970 | Weitbrecht | 379/108 |
| 3,896,267 | 7/1975 | Sachs et al. | 379/52 |

(List continued on next page.)

FOREIGN PATENT DOCUMENTS

| 1162336 | 2/1984 | Canada | 379/90 |
|---|---|---|---|

OTHER PUBLICATIONS

*Disk Operating System Version 2.10*, IBM/Microsoft User Manual (1983) pp. 2–35.

R.L. Smith, "Baudot to ASCII", *Radio Electronics*, Apr. 1976, pp. 57–59, 82, 83, 86.

"Telesonic Offers TDD Capabilities: Improves Access For Hearing Impaired", *Voice Technology News*, Jun. 18, 1991, pp. 4–5.

"News Bytes", *Telephony*, Jul. 1, 1991, p. 14.

Fike et al., "Understanding Telephone Electronics", pp. 242, 243, ©1984.

Instruction Manual, "Communicating With Your Superprint ES", Ultratec, Inc. (1988).

*Primary Examiner*—Brian K. Young
*Attorney, Agent, or Firm*—Roylance, Abrams, Berdo & Goodman, L.L.P.

[57] ABSTRACT

An automatic telephone answering system employs a switch activated by any of several techniques to select a language for communication with a caller. A single matrix determines the content of a message to be generated in response to input from the caller. A single matrix can be used because it is arranged in accordance with the content of the various messages and not on the specific language of the messages. All of the messages for each respective language are stored in a separate directory such that a given identifier obtained from the matrix will recall that message in the language determined by identification of the particular directory. A telecommunications device for the deaf (TDD) is treated in the same manner as a language and selection of messages employs the same matrix used for traditional languages. Received TDD signals are converted to ASCII for storage, and messages to be identified by the matrix are stored in ASCII and converted to TDD before transmission.

20 Claims, 24 Drawing Sheets

U.S. PATENT DOCUMENTS

| | | | |
|---|---|---|---|
| 4,013,967 | 3/1977 | Fassbind | 328/140 |
| 4,181,813 | 1/1980 | Marley | 379/52 |
| 4,210,777 | 7/1980 | Bowerman et al. | 375/117 |
| 4,268,721 | 5/1981 | Nielson et al. | 379/52 |
| 4,365,315 | 12/1982 | Jamnik | 364/900 |
| 4,420,656 | 12/1983 | Freeman | 179/6.04 |
| 4,421,951 | 12/1983 | Van Bosse | 379/98 |
| 4,523,055 | 6/1985 | Hohl et al. | |
| 4,604,406 | 8/1986 | Gurmarnik | 434/157 |
| 4,608,457 | 8/1986 | Fowler et al. | 379/52 |
| 4,615,002 | 9/1986 | Innes | 364/200 |
| 4,626,623 | 12/1986 | LaHaye | 379/95 |
| 4,633,777 | 1/1987 | Szeto . | |
| 4,635,199 | 1/1987 | Muraki | 364/419 |
| 4,700,322 | 10/1987 | Benbassat et al. | 364/513.5 |
| 4,701,943 | 10/1987 | Davis et al. . | |
| 4,712,189 | 12/1987 | Mohri | 364/900 |
| 4,716,583 | 12/1987 | Groner et al. | 379/88 |
| 4,769,642 | 9/1988 | Davis . | |
| 4,790,003 | 12/1988 | Kepley et al. . | |
| 4,799,254 | 1/1989 | Dayton et al. | 379/96 |
| 4,803,312 | 2/1989 | Britos | 178/17 R |
| 4,809,577 | 3/1989 | Fujita | 84/1.01 |
| 4,811,379 | 3/1989 | Grandfield . | |
| 4,813,014 | 3/1989 | DeBell . | |
| 4,837,689 | 6/1989 | Tanaka et al. | 364/419 |
| 4,849,966 | 7/1989 | Willis et al. . | |
| 4,866,755 | 9/1989 | Hashimoto | 379/80 |
| 4,914,618 | 4/1990 | Dodge | 375/117 |
| 4,959,847 | 9/1990 | Engelke et al. | 379/98 |
| 4,972,462 | 11/1990 | Shibata | 379/98 |
| 4,996,707 | 2/1991 | O'Malley et al. | 381/52 |
| 5,016,220 | 5/1991 | Yamagata . | |
| 5,121,421 | 6/1992 | Alheim | 379/52 |
| 5,163,081 | 11/1992 | Wycherley et al. | 379/52 |
| 5,253,285 | 10/1993 | Alheim | 379/52 |
| 5,450,470 | 9/1995 | Alheim | 379/52 |

5,670,957

METHODS FOR COMMUNICATING WITH A TELECOMMUNICATIONS DEVICE FOR THE DEAF

This is a division of application Ser. No. 08/308,344, filed Sep. 19, 1994, now U.S. Pat. No. 5,499,285 which is a continuation of application Ser. No. 07/790,257, filed Nov. 12, 1991, now U.S. Pat. No. 5,388,146.

TECHNICAL FIELD

This invention relates to the art of automatic telephone systems capable of communicating in several languages.

BACKGROUND OF THE INVENTION

Automated telephone answering systems are known. These systems are capable of delivering prerecorded messages and of receiving inputs from the caller either in the form of signals from the telephone, such as the Touch Tone or rotary dial signals, or voice messages from the caller. These systems communicate with humans either directly by producing the sounds of human speech or indirectly through signals which are interpreted by an electrical or electromechanical device.

An automated telephone system generally consists of an input module, a control module, and an output module, even though the line of distinction is sometimes not clear. The control module may be the CPU of a computer while the input and output modules are combined in a single input-output processor (IOP) which may also be located in the computer.

An input is most-often the Dual Tone Multi Frequency (DTMF) known commonly by the trademark Touch Tone. Normal speech is used. as an input to those systems which incorporate either speech recognition or the assistance of human operators. A simple form of speech recognition, frequently used, provides a binary signal to indicate the presence or absence of normal speech. Another input signal is the teletype, which generally includes the use of a MODEM.

The most common output is speech, but teletype with the use a MODEM is also common.

The control module determines which event to initiate upon completion of a previous event. An "event" consists of an action initiated by the automated telephone system and a response. For the purposes of the instant invention, the action of interest is the communication of speech and teletype. The response generally comes from the caller, but need not, and some actions do not require a response.

For example, the action may be a message asking the caller to press one of several telephone buttons to obtain selected information. ("Press 1 for information about patents.") The response consists of signals representing the button pushed. In a complicated system, the action of the subsequent event is a function of the response to the first action.

There are several ways to store the instructions for the control unit. A preferred system, for example, stores the instructions in an M×N "instruction" or "message" matrix. Each row of the matrix, 1 through M, corresponds to an event, while the columns, 1 through N, correspond to a response to the event such as a Touch Tone entry or to no entry at all. One exemplary matrix has over one thousand rows and 11 columns.

The input/output hardware typically consists of a telephone line interface, a microprocessor, a DTMF detector, digital-to-analog and analog-to-digital converters, and associated electronics. Often, the electronics include data compression chips to reduce the amount of memory required by digitized messages.

An important device used with these telephone systems is the Telecommunications Device for the Deaf, or "TDD", which is used by those with a hearing impairment. These are special teletype terminals which provide a cradle to receive a regular telephone handset. The terminal is equipped with a keyboard and a display screen. These systems are limited to communication with other TDD systems, a TDD caller being unable with present equipment to call a private business exchange (PBX) switchboard.

SUMMARY OF THE INVENTION

A. The Event Matrix

In accordance with one aspect of the invention, a telephone system comprises a unique system for separating the language of a message from the content of the message. In addition, the invention includes means for treating communication with the TDD systems as a "language." The first permits a much simpler automated telephone system for a plurality of languages, and the second greatly facilitates automated telephone communication with a hearing impaired caller and allows it to be implemented in a system having the first feature.

The system of the invention for separating the language of a message from the content of the message utilizes an "event matrix", similar to a look-up table, which is stored in the random access memory (RAM) of the computer. The rows of the matrix are events and the columns are responses, as described above. The elements of the matrix are instructions to the computer to execute the next event, which would in turn be another row of the matrix.

The first row of the matrix is preferably a software selector for selecting a language. Thus, the first event may be to play the message:

"This is a multi-lingual service, please stand by while we address callers in Swedish . . . For information på svenska tryck 2 på telefonens nummerskiva. . . . For English press 1 on the Touch Tone pad."

When the caller responds by pressing a number, the computer locates the next event by determining the intersection between the first event row and the Touch Tone number column. This next event in the answering system embodiment of the invention is to identify the sub-directory where messages of the selected language are located.

The identification of the sub-directory may be accomplished in any of several ways. For example, the operating system of the computer may be instructed to change the default directory to the selected sub-directory. This would mean that an instruction to call up a selected file would cause the computer to search that sub-directory for that file. The English sub-directory could be named "\English" while the Swedish sub-directory could be named "\Swedish."

An important feature of the invention is that the name of the file (e.g., "message 10") in a first sub-directory for a message conveying a given thought in the first language (e.g., "Press 1 for the dog catcher, press 2 for a pizza") is the same as the name of the file in a second sub-directory for conveying the same thought in the language of the second sub-directory (e.g., Tryck 1 for hundfångaren, tryck 2 for en pizza). Thus, after the first event is completed and the language selected, the remaining elements of the matrix are independent of the language. Each of these elements is preferably a computer word instructing the computer to perform a task such as to execute "Message 10", "Message 110", "Message 120", etc. Because there is only one event matrix for all languages, the matrix need be tested only once. This greatly simplifies the development of a multi-lingual system because the matrix for a complicated system is very large, and testing of the matrix is quite time consuming. Also, because a single event matrix handles any number of languages, computer memory is used more efficiently.

With the system of the invention, the matrix is developed with respect only to the content of the messages, not the particular language. The particular expressions for the messages in a language are developed separately from the logic of the matrix and are stored in the particular language sub-directory. This effectively separates the decision logic from the language.

There are two known methods for instructing the computer which language to select. The first has been set forth above and is where a telephone button is pressed. A second is to determine which telephone line carries the call, a different telephone number being listed in the telephone book for each respective available language.

A third technique, useful with the invention, appears to the caller to be similar to the second technique but uses Direct Inward Dialing (DID) trunk lines. DID trunk lines typically consist of a number of physical trunk lines which are associated with a larger number of telephone numbers. When a caller is connected by the Central (telephone) Office through a DID line, the Central Office first sends, through the DID line, at least some of the digits of the dialed number. The last few of these digits identify the number being called.

In accordance with this third technique, the computer telephone ports are connected to the Direct Inward Dialing (DID) trunk lines through an input device which strips off the last few digits, which identify the individual telephone number, and communicate these to the computer. The particular telephone number dialed by the caller has been advertised in the telephone directory (e.g., "Please call 540-0100 for English and 540-0110 for Spanish) for communication in a particular language, and the stripped off digits (e.g., 00 and 10) indicate to the computer the language desired by the caller. The input device capable of stripping off the relevant digits and sending the relevant signals to the computer to switch to the appropriate language is commercially available.

As noted above, the elements of the matrix are computer words. If the computer is capable of 16-bit words, there are over 65,500 (specifically $2^{16}$) possible words. Because even a complicated matrix does not have that many distinct "event" rows, a substantial number of words are available for purposes other than defining next "events". These are used to advantage in the system of the invention for such purposes as overrides, timing, etc. For example a timer may be activated to determine whether the caller has responded in a set time and to take a predetermined action.

Another use of the extra available words is to permit the matrix to operate as a branch. The language dependent switch used in the invention is preferably a normal branching switch adapted to provide the additional property of language selection.

The strict branching property of the switch would be used, for example, when a caller records a message, which will later be transcribed. This recording would be switched to the directory appropriate to the language so that transcribers could select the directory for transcription with the knowledge that all recordings in the directory are in the same language. Similarly, when a caller is transferred to live operators, he would be transferred to an extension used by an operator who can converse in the caller's language.

While an important aspect of the invention is based on the separation of the language of a message from its content, it should be noted that the two are sometimes very closely related and it makes sense to provide certain kinds of information in one language and not in another. For example, TDD callers asking for information about theater programs would want to know whether translations are provided in sign language. To accommodate this, the system according to the invention permits some variance in the information provided in various languages.

Special functions are also accommodated by the invention. For example, the preferred voice communication system used with the invention, the Microlog VCS 3500 Voice Communications System, like other Voice Communication Systems, has the ability to speak numbers, dates and times by stringing together individual words according to rules of English. The rules may, however, be different in a different language, and there are even differences between American and British English. For example, 201 is spoken as "two hundred one" in American usage, but as "two hundred and one" in British usage.

Fortunately, there are fewer rules than there are languages. According to the invention, the different rules must be built into the program. When a user selects a new language for his or her application, the user must, in addition to selecting a language and type (VOICE or ASCII), select the appropriate rules for numbers, dates, and times.

In some instances a message in one language may also be used in another language. This occurs particularly where two languages are not different languages in the usual sense, but merely represent two different levels of detail in the same conventional language. In the absence of a recording having a desired content in one of those languages, a recording having the desired content in the other language should be used. That other language is called the "default" language, and its denomination is part of the language specification. Thus, selection of a new language requires identification of the language and type (VOICE or ASCII), the rules for spoken numbers, spoken dates, and spoken times, and identification of the default language.

B. Treatment of TDD Signals As A Language

Those with hearing impairment often use a TDD for transmitting messages over telephone lines. TDD is a special form of teletype which generates signals representing characters from two signals, one having a frequency of 1800 Hz and the second having a frequency of 1400 Hz. Characters are formed by combinations of these frequencies using the Baudot code. The Baudot code uses a sequence of five data pulses to represent upper case alphabetic characters, numeric characters, and the common punctuation marks, and start and stop pulses to set off the data pulses. A "1" is represented by a 1400 Hz signal while a "0" is represented by a 1800 Hz signal.

Messages which are to be communicated to a hearing impaired person by TDD are stored in a computer in the same arrangement with respect to information content as are messages which are to be communicated, via digitized speech, to a hearing person. For example, a selected message will be provided in the English sub-directory, the Swedish sub-directory, and TDD sub-directories for each of the desired languages. The TDD messages having the same informational content as corresponding speech messages will have a name with a first part unique to the TDD sub-directory and a second part identical to that of other messages having the same informational content.

The characters of the TDD messages are stored in ASCII format. Storing messages is greatly simplified by this technique because systems capable of storing messages in ASCII format (e.g., a personal computer) are in common use. Generation of a message for transmission to a TDD can be accomplished by storing directly in ASCII format a message generated on a personal computer. The first part of the name of the message contains the identifier for the TDD subdirectory, and the second part contains the same name as messages of similar informational content in other languages.

Although the nominal TDD transmission rate of six characters per second appears quite slow in most cases, it may be too fast if the subject matter is complicated. An unique aspect of the system according to the invention is that it allows the user interactively to reduce the transmission rate in those instances.

When it is desired to transmit a TDD message, the message is recalled from memory, converted to TDD signals, and transmitted over a telephone line to the TDD.

In a similar manner, signals representing a message from a person communicating by way of a TDD are converted to ASCII signals and stored as ASCII signals. These ASCII signals can then be retransmitted easily by known equipment or read directly by any of the wide variety of systems in common use capable of reading ASCII signals.

The conversion of TDD signals to ASCII signals is accomplished by a technique that does not require complete reconstruction of the signal, which has the advantage of increased speed. According to this technique, the frequency (1400 Hz of 1800 Hz) of the data pulses is determined first. This is complicated by the fact that most of the signals received will have been compressed in accordance with a known compression algorithm. Determination of the frequency is accomplished by ascertaining whether the signal level exceeds a threshold, to eliminate noise, and then by counting the number of slope reversals per unit time to determine the frequency of the signal. The signals representative of the set of five data pulses of the Baudot code are supplied to a look-up table maintained in the RAM of the computer, and the corresponding ASCII code for that character is determined.

Another advantage of storing messages intended for use with TDD is based on the availability of devices which convert ASCII signals to speech. The two primary methods for electronic generation of speech are digitized speech and synthesized speech. Digitized speech is preferred by Applicant because the reproduced voice is of much higher quality, even though it requires more storage space than synthesized speech.

Messages to be converted to synthesized speech are generally stored in ASCII format and converted to synthesized speech by known software. Thus, the messages which have been received from a TDD and stored as ASCII signals can be supplied to a synthesizing module and converted to speech. In this manner, the messages from the TDD can be taken by a hearing person through an ordinary telephone, which greatly simplifies the process.

BRIEF DESCRIPTION OF THE DRAWINGS

FIGS. 2 through 25 are flow charts showing various aspects of the invention.

DETAILED DESCRIPTION OF THE PREFERRED EMBODIMENT

Figure 1:
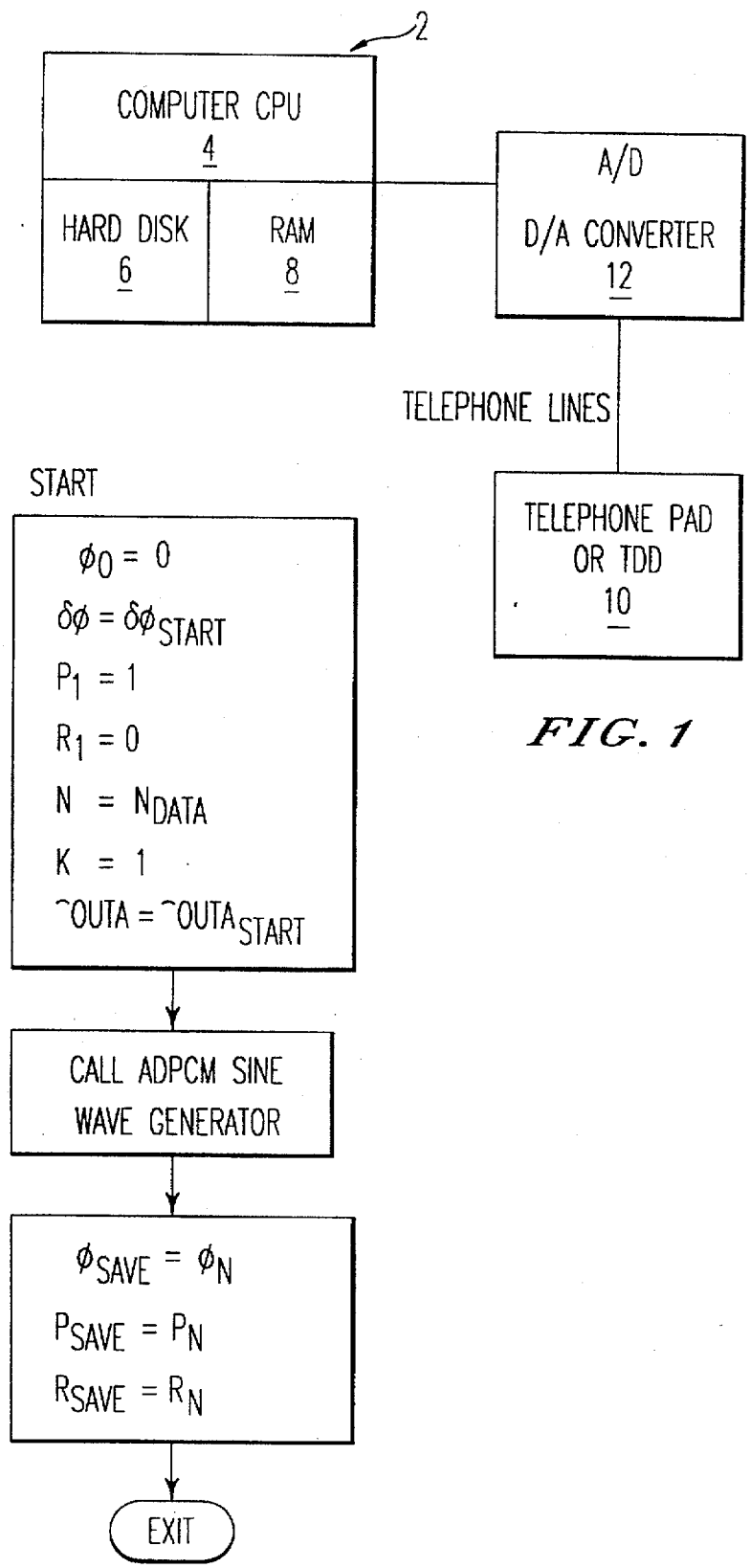
FIG. 1 is a block diagram of an apparatus in accordance with the invention.

With reference to FIG. 1, a computer 2 having a CPU 4, a hard disk 6 and a random access memory (RAM) 8 is connected to a user's telephone pad or TDD 10 by telephone lines. The signals on the telephone lines are analog, while those communicated to the computer are digital, and the conversion is accomplished by the A/D:D/A converter 12 as is known in the art. The RAM of the computer has stored therein the lookup table for conversion of the Baudot code to ASCII and reverse. The RAM also has stored therein tie matrix which correlates the responses from the user with the next event. Thus, when the computer answers the telephone call from the users, it may ask that a Touch Tone button be pressed to identify the desired language of the user. The sensing of a code for English will instruct the computer to use the subdirectory for that language just as the sensing of the code for the TDD will instruct the computer to use the subdirectory for that "language". Because the messages in the various subdirectories having similar informational contents have the same names within the particular subdirectory, the matrix stored in RAM need not be concerned with the language and can simply instruct the computer in the same manner for the same event in any language.

Conversion of ASCII Signals to TDD Signals

TDD is a special form of teletype. Because of the failure of the manufacturers of TDD terminals to agree on a standard specification, there is none. There is, however, a draft to a standard. That standard, draft 9 (June, 1986, PN-1663), was placed in the public domain by the Electronic Industries Association Engineering Committee TR41 in 1981. The implementation of conversions from ASCII to TDD and vice-versa follows that standard.

TDD may briefly be described as follows. It uses 5-level Baudot Code at a nominal speed of 45.45 baud (1000/22, to be precise), half-duplex transmission and the frequency convention of 1400 Hz for Mark and 1800 Hz for Space. For a specification of character formats see page 41 of PN-1663.

Half-duplex transmission means that each system can receive and transmit, but not simultaneously. In a strict TDD environment that is true. In the invention, however, Touch Tone signals can be received and detected at the same time that the system is transmitting in the TDD mode. The feature to detect Touch Tone signals is a natural consequence of TDD being implemented as another language.

It is not very difficult to calculate the voltage levels that need to be output to the Digital to Analog converter 12 to be consistent with character formats and nominal bit durations and frequencies. The invention, however, takes a different approach from the standard one. The reason for this is that the invention is intended for multi-line applications and therefore processing speed is very important. According to the invention, the conversion from ASCII to Baudot code and hence to TDD format is done before any character transmission takes place. This is done for all 32 Baudot codes, and the results are stored in RAM 8. A typical application might require 16,000 bytes of RAM for that storage.

Pre-computation of TDD formats does, however, bring in an extra complication. Unless the TDD formats for all Baudot codes have total phase shifts which are integral numbers of cycles, then there will be phase discontinuities between characters. Such discontinuities may not be important under ideal transmission conditions, but may critically affect character reception under marginal transmission conditions. The invention adjusts frequencies and bit durations to achieve this aim without straying outside the specification.

A. Adjustment of nominal frequencies and bit durations.

Each character to be transmitted consists of 7.5 bits, consisting of one start bit, five data bits and 1.5 stop bits. The bit duration, according to the specification, is 22.00±0.40 ms. The start bit and a binary '0' are represented by a space frequency. The stop bit and a binary '1' are represented by a Mark frequency. The Mark frequency=1400 Hz±1%. The Space frequency=1800 Hz.±1%.

B. Start and Data Bits: Number of samples per bit.

The number of samples per bit is obtained by multiplying the digitization rate by the bit duration. For convenience, the bit duration is adjusted (by the least possible amount) to make the number of samples per bit an even integral number. That number is referred to as $N_{DATA}$.

For a sampling rate of 6053.22 Hz, the nominal number of samples per nominal bit is 133.166. Adjusting that number to 134 ($N_{DATA}$=134) gives a derived bit length of 22.137 ms, which is well within specification. It can easily be shown that for digitization rates above 4000 Hz the maximum deviation of the derived from the nominal bit duration is less than 0.25 ms.

C. Start and Data Bits: Mark and Space Frequencies.

The Mark and Space frequencies for the start and data bits are adjusted so that fractional phase change for a bit is the same for either frequency. The calculation is as follows.

Let n be the derived bit duration, $F_{MN}$ the nominal Mark frequency (Hz), $F_{SN}$ the nominal space frequency (Hz), $F_M$ the derived Mark frequency (Hz), $F_S$ the derived Space frequency (Hz) and let x be a dimensionless number. Then, $$F_S=(1-x) F_{SN}, F_M=(1+x) F_{MN},$$

where $$x=[(F_{SN}-F_{MN})n]_f/[(F_{SN}+F_{MN})n]$$

where

[ ]$_f$ denotes 'the smallest fractional part of'.

Note that [ ]$_f$ may be either positive or negative. Its maximum magnitude is therefore 0.5, which in turn puts an upper bound on x of 0.0071, which is within specification. For a digitization rate of 6053.22, we find that (noting that n=22.137 ms)x=−0.00205, $F_S$=1803.690 and $F_M$=1397.130.

D. Stop Bit: Number of samples and Frequency.

It is not critical that the duration of the stop bit equal its nominal value of 33 ms. The number of samples in the stop bit is selected as an even number which yields a stop bit duration of at least 33 ms. The selected number, $N_{STOP}$, must be consistent with the Stop frequency, $F_{STOP}$, being within 1 percent of the nominal Mark frequency. $N_{STOP}$ is selected as, a number satisfying the above criteria. The Stop frequency is calculated as the frequency closest to the nominal Mark frequency that yields an integral phase change for the complete character. It is calculated as $$F_{STOP}=F_{MN}-[6 F_M n+T_{STOP} F_{MN}]_f/T_{STOP}.$$

For a digitization rate of 6053.22, we have selected
$N_{STOP}$=204,
whence $T_{STOP}$=33.701 ms
and $F_{STOP}$=1407.391.

E. Pre-Start: Initial Transmission Before First Character.

Before starting character transmission, 50 samples of total silence are transmitted followed by a Mark frequency for the duration of at least one bit. This is referred to as the pre-start sequence. The Pre-Start Mark frequency is selected such that the fractional phase change, for the transmission of that bit, is zero. With n=duration of the bit, we calculate $$F_{PRE-START}=F_{MN}-[F_{MN} n]_f/n.$$

For a digitization rate of 6053.22 and a bit duration of 22.137 ms, we obtain $F_{PRE-START}$=1400.372

F. Post-Stop: Transmission after last character.

After the last stop bit, 6 bits (of length n) at frequency $F_{PRE-START}$ are transmitted. This is referred to as the post-stop sequence.

It was earlier stated (see section D above) that it is not critical for the length of the stop bit to be equal to its nominal value. In fact, it may be indefinitely long, which provides an advantage. Extending the stop bit provides a convenient way to slow the transmission rate measured in characters per second. Since the pre-start frequency was chosen to have a zero fractional phase change per bit (of length n), bits of the post-stop sequence may be used to extend the stop-bit (from that defined in D above) without affecting its total phase shift.

G. Conversion of frequency to phase shift.

The phase shift, measured in cycles, between two digitized samples corresponding to a frequency F is given by $\delta\phi(F)=F/D$, where D is the digitization rate.

For a digitization rate of 6053.22 we have
$\delta\phi_M=\delta\phi(1397.130)=0.2308078$
$\delta\phi_{PRE-START}=\delta\phi(1400.372)=0.2313433$
$\delta\phi_{STOP}=\delta\phi(1407.391)=0.2325028$
$\delta\phi_S=\delta\phi(1803.690)=0.2979719$ H. Calculation of phase and amplitude.

The initial phase is set to zero. At each sample the phase is incremented by the appropriate value of $\delta\phi$, the frequency of the samples being that of the digitization rate. If the current phase is denoted by $\phi$, and the current amplitude by A, then $$A=A_{MAX} \sin(\phi),$$

where $A_{MAX}$ is the maximum-amplitude and $\phi$ is measured in cycles. (1 Cycle=360 degrees=$2\pi$ radian). The computed amplitude is then modified for output, either directly to the digital to analog converter, or first to a data compression software module. In either case, a bias is added to computed amplitude. The value of the bias corresponds to half the maximum voltage of the digital to analog converter. $A_{MAX}$ is software selectable, but must be less than the bias.

In conventional TDD transmissions the amplitude is fixed. There are two reasons why we might wish to use a lower than maximum $A_{MAX}$:

(1) TDD transmission at maximum $A_{MAX}$ is so loud that conventional DTMF (Touch Tone) detectors do not function properly in the presence of such a transmission.

(2) TDD transmission at maximum $A_{MAX}$ is so loud that people without hearing impairment will soon acquire one if they have to listen to this kind-of transmission for any length of time. Why would anybody want to listen to a TDD transmission? Because the line may be shared between hearing and non-hearing callers and the program may wish to address both types of caller in an effort to differentiate between them.

The software selection of $A_{MAX}$ is accomplished by embedded codes in the text defining the transmission. This approach is similar to that used in word processors, where underline, bold, subscript etc. are defined by such embedded codes.

I. Pre-computing character strings.

To save time computing the digitized wave forms all 32 Baudot characters are pre-computed and stored in RAM. This differs from the conventional approach. The digitized wave form corresponding to a character is, in the following, referred to as a character string. The digitized pre-start and post-stop wave forms are likewise referred to as character strings. We distinguish between wave forms which are stored in compressed form and those, which are not.

UNCOMPRESSED WAVE FORMS. Since the start and stop bits are identical for all characters, we store only one digitized wave form for the start bit and one for the stop bit. Likewise, we store only one digitized wave form for the pre-start and post-stop sequences. Separate digitized wave forms for the data bits are, however, stored for all 32 characters.

COMPRESSED WAVE FORMS. The case considered here is ADPCM (see section J below). Because the ADPCM output always tries to catch up with the uncompressed input, compressed digitized wave forms for the stop bits of the 32 Baudot characters will not be the same. At the end of the stop bit the digitized outputs for all 32 characters are, however, close to being the same. For that reason we store the digitized wave forms for the data and stop bits for all 32 characters. As in the uncompressed case we store only one set of wave forms for the start bit, and the pre-start and post-stop sequences.

J. ADPCM Data 4-bit Compression.

Data compression is implemented according to the algorithms given in "OKI application Note 84-2" by Al Kase (March 1984), OKI semiconductor inc., 650 N. Mary Avenue, Sunnyvale, Calif. 94086. The following quantities are calculated iteratively. Subscript $H$, in all cases, refers to the H-th iterative value.

$A_H$=computed (uncompressed) amplitude
$R_H$=ADPCM (re-constituted) amplitude
$D_H=A_H-R_H$
$Q_H$=computed step in amplitude
$P_H$=Step pointer
$S_H$=Step size
$L_H$=compressed data (4 bits)

TABLE 1

STEP POINTER INCREMENT ($\delta P_H$) AS FUNCTION OF $L_H$.

| $L_H$ | $\delta P_H$ | $L_H$ | $\delta P_H$ | $L_H$ | $\delta P_H$ | $L_H$ | $\delta P_H$ |
|---|---|---|---|---|---|---|---|
| 0 | −1 | 4 | +2 | 8 | −1 | 12 | +2 |
| 1 | −1 | 5 | +4 | 9 | −1 | 13 | +4 |
| 2 | −1 | 5 | +6 | 10 | −1 | 14 | +6 |
| 3 | −1 | 7 | +8 | 11 | −1 | 15 | +8 |

TABLE 2

STEP SIZE AS FUNCTION OF STEP POINTER

| $P_H$ | $S_H$ | $P_H$ | $S_H$ | $P_H$ | $S_H$ | $P_H$ | $S_H$ |
|---|---|---|---|---|---|---|---|
| 1 | 16 | 14 | 55 | 27 | 190 | 40 | 658 |
| 2 | 17 | 15 | 60 | 28 | 209 | 41 | 724 |
| 3 | 19 | 16 | 66 | 29 | 230 | 42 | 796 |
| 4 | 21 | 17 | 73 | 30 | 253 | 43 | 876 |
| 5 | 23 | 18 | 80 | 31 | 279 | 44 | 963 |
| 6 | 25 | 19 | 88 | 32 | 307 | 45 | 1060 |
| 7 | 28 | 20 | 97 | 33 | 337 | 46 | 1166 |
| 8 | 31 | 21 | 107 | 34 | 371 | 47 | 1282 |
| 9 | 34 | 22 | 118 | 35 | 408 | 48 | 1411 |
| 10 | 37 | 23 | 130 | 36 | 449 | 49 | 1552 |
| 11 | 41 | 24 | 143 | 37 | 494 | | |
| 12 | 45 | 25 | 157 | 38 | 544 | | |
| 13 | 50 | 26 | 173 | 39 | 598 | | |

ALGORITHM.
$B_3=0$ $D_H \geq 0$
$B_3=1$ $D_H>0$
$d_2=abs(D_H)$
$S_H=S(P_H)$ [From Table 2]
if $d_2 \geq S_H$ then $B_2=1$ and $d_1=d_2-S_H$
if $d_2<S_H$ then $B_2=0$ and $d_1=d_2$
if $d_1 \geq S_H/2$ then $B_1=1$ and $d_0=d_1-S_H/2$
if $d_1<S_H/2$ then $B_1=0$ and $d_0=d_1$
if $d_0 \geq S_H/4$ then $B_0=1$
if $d_0 \geq S_H/4$ then $B_0=0$
$L_H=8*B_3+4*B_2+2*B_1+B_0$
$\delta P_H=\delta P(L_H)$ [From Table 1]
if $B_3=0$ then $Q_H=B_2*S_H+B_1*S_H/2+B_0*S_H/4+S_H/8$
if $B_3=1$ then $Q_H=-(B_2*S_H+B_1*S_H/2+B_0*S_H/4+S_H/8)$
$P_{H+1}=P_H+\delta P_H$ (Note that the value of $P_{H+1}$ may need adjustment in order to restrict it to the interval [1, 49])
$R_{H+1}=R_H+Q_H$ Note that the above algorithm for the computation of $L_H$ and $Q_H$ is referenced in FIG. 2 as
$L_H=L(D_H, S_H)$
$Q_H=Q(D_H, S_H)$ Each sample yields a 4-bit output ($L_H$). Two consecutive outputs are packed in an 8-bit output byte. Bits 4–7 of the output byte refer to an earlier time than bits 0–3.

Initial values are given by
$R_1=0$ (or bias value)
$P_1=1$

Figure 2:
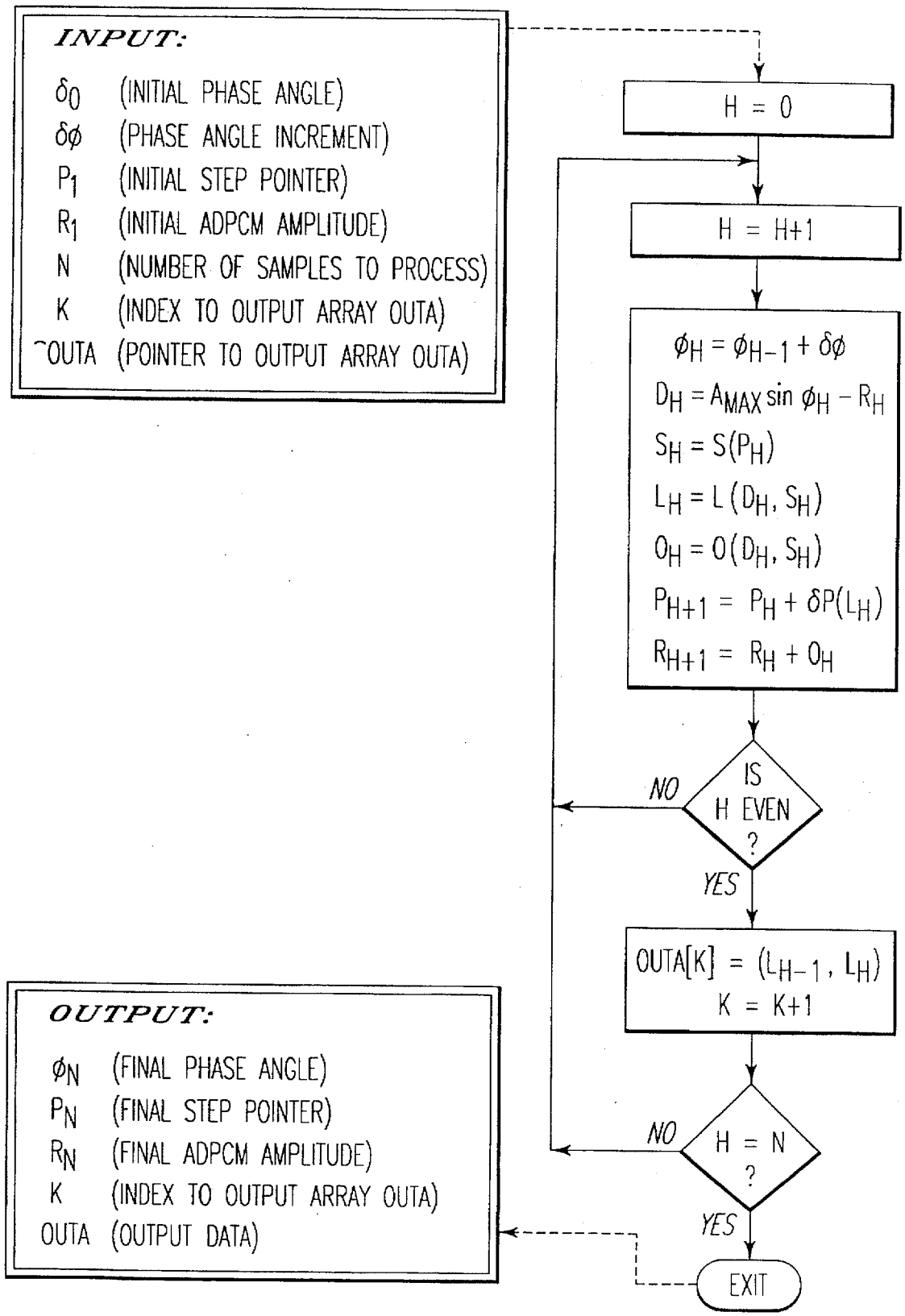

A flow chart for generating a single frequency sine wave in compressed form is shown in FIG. 2.

K. Number of samples per character.

The number of samples that make up the digital representation of the analog wave form of a character is obtained by adding the samples required for a start bit, 5 data bits and a stop bit.

For a digitization rate of 6053.22 that number is 1008. With ADPCM data compression each data byte contains 2 samples. In that case the number of bytes per character is 504.

L. Storage requirements for pre-computed 'characters'.

The numbers given below are all for a digitization rate of 6053.22 samples per second.

| UNCOMPRESSED CASE. We must store | | |
|---|---|---|
| pre-start: | 50 silence samples | (50 samples) |
| | 1 bit at Mark freq. | (134 samples) |
| start-bit: | 1 bit at Space freq. | (134 samples) |
| stop-bit: | 1 bit at Mark freq. | (204 samples) |
| post-stop: | 6 bits at Mark freq. | (804 samples) |
| data: | 32 sets of 5 bits. | (21440 samples) |
| TOTAL | | 22766 samples |

Since in the uncompressed case it takes one byte of storage for each digital sample, the total requirement is 22766 byes.

| COMPRESSED CASE. We must store | | |
|---|---|---|
| pre-start: | 50 silence samples | (50 samples) |
| | 1 bit at Mark freq. | (134 samples) |
| start-bit: | 1 bit at Space freq. | (134 samples) |
| post-stop: | 6 bits at Mark freq. | (804 samples) |
| data: | 32 sets of 5 bits. | (21440 samples) |

-continued

| COMPRESSED CASE. We must store | | |
|---|---|---|
| stop: | 32 sets of 1 bit at Mark freq. | (6528 samples) |
| | TOTAL | 29090 samples |

Since in the compressed case it takes one byte of storage per 2 digital samples, the total requirement is 14545 bytes.

Note that the above storage requirements (compressed or uncompressed) are given for only one transmission amplitude (as defined by $A_{MAX}$). For two different transmission amplitudes the requirements are doubled, for three they are trebled, and so on.

Figure 3:
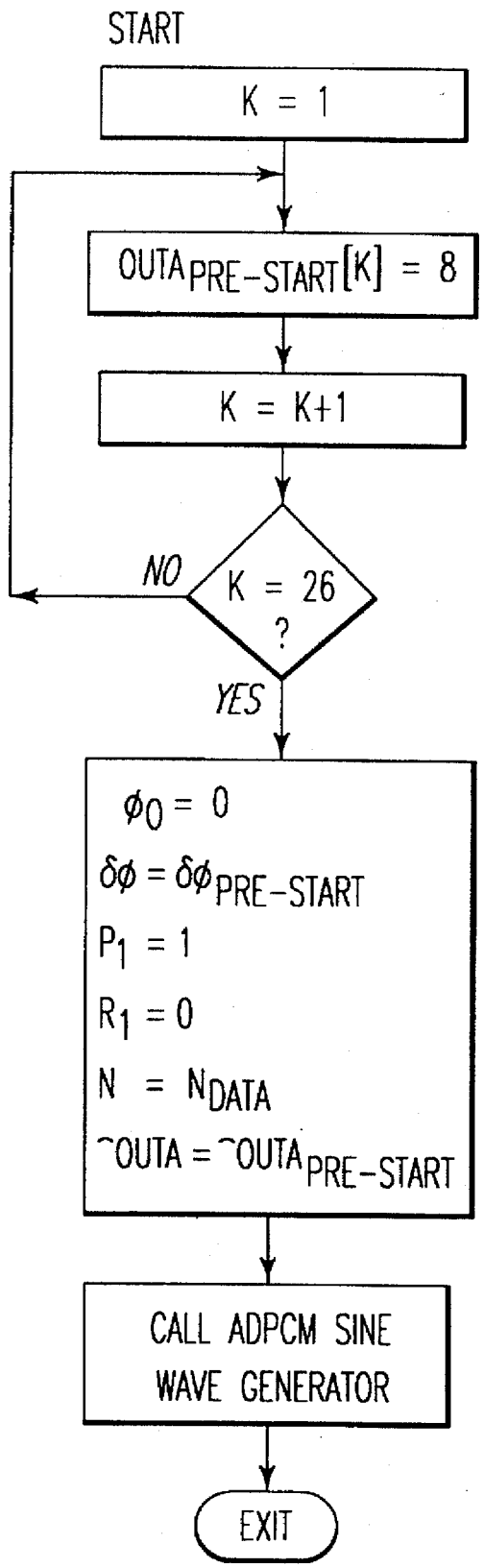
Figure 5:
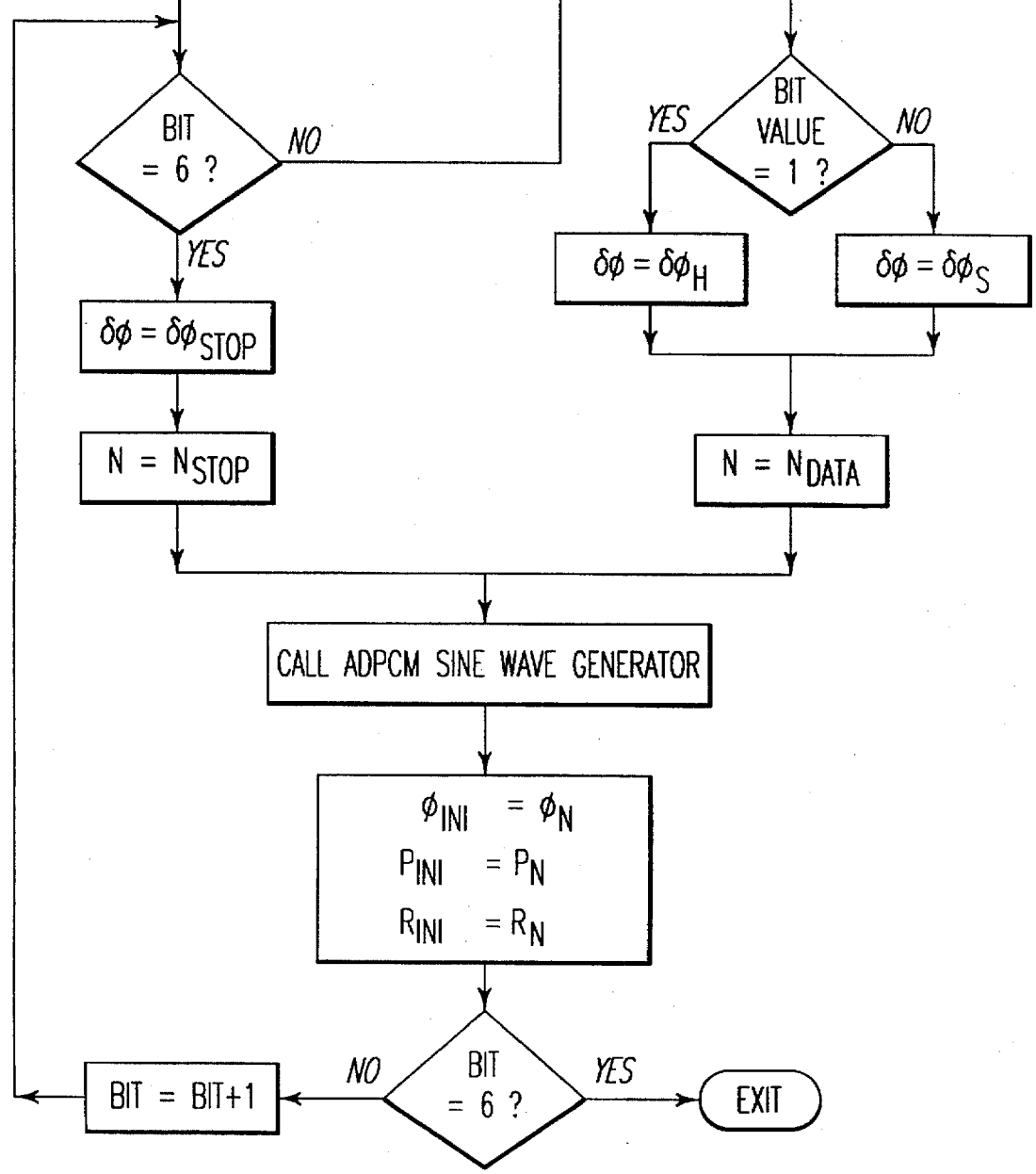
Figure 6:
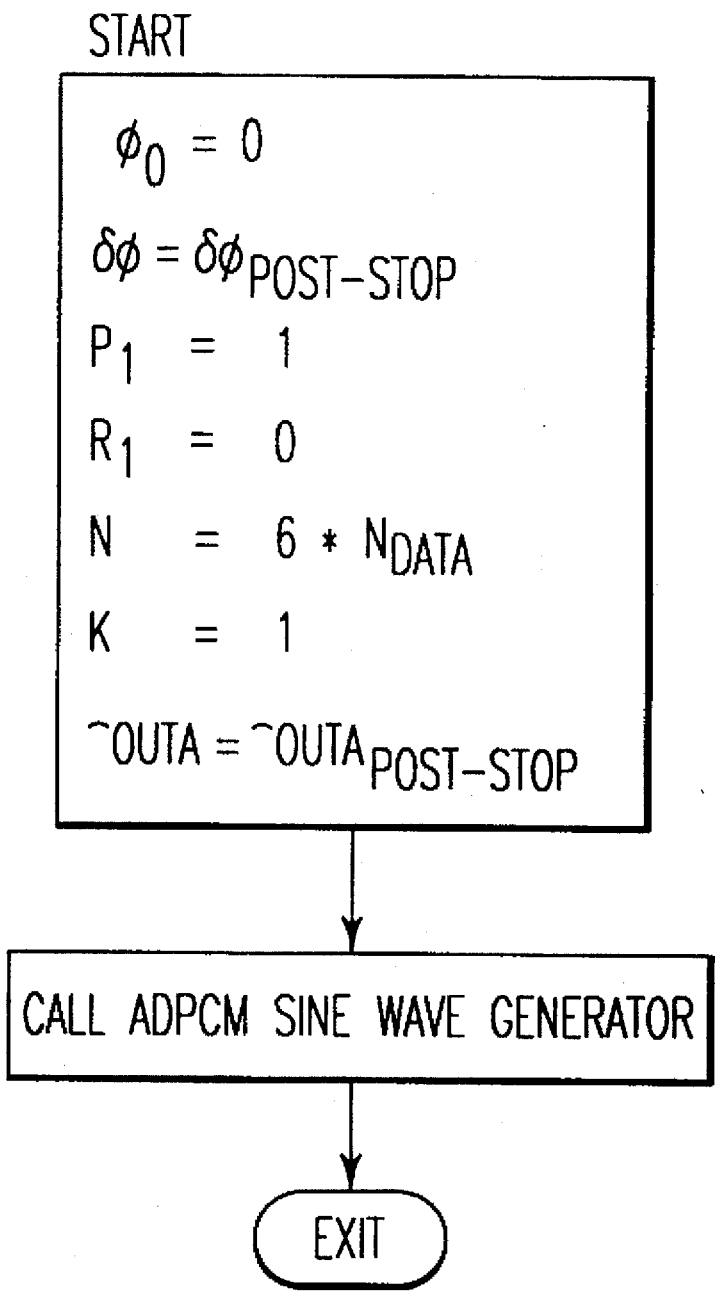
Figure 7:
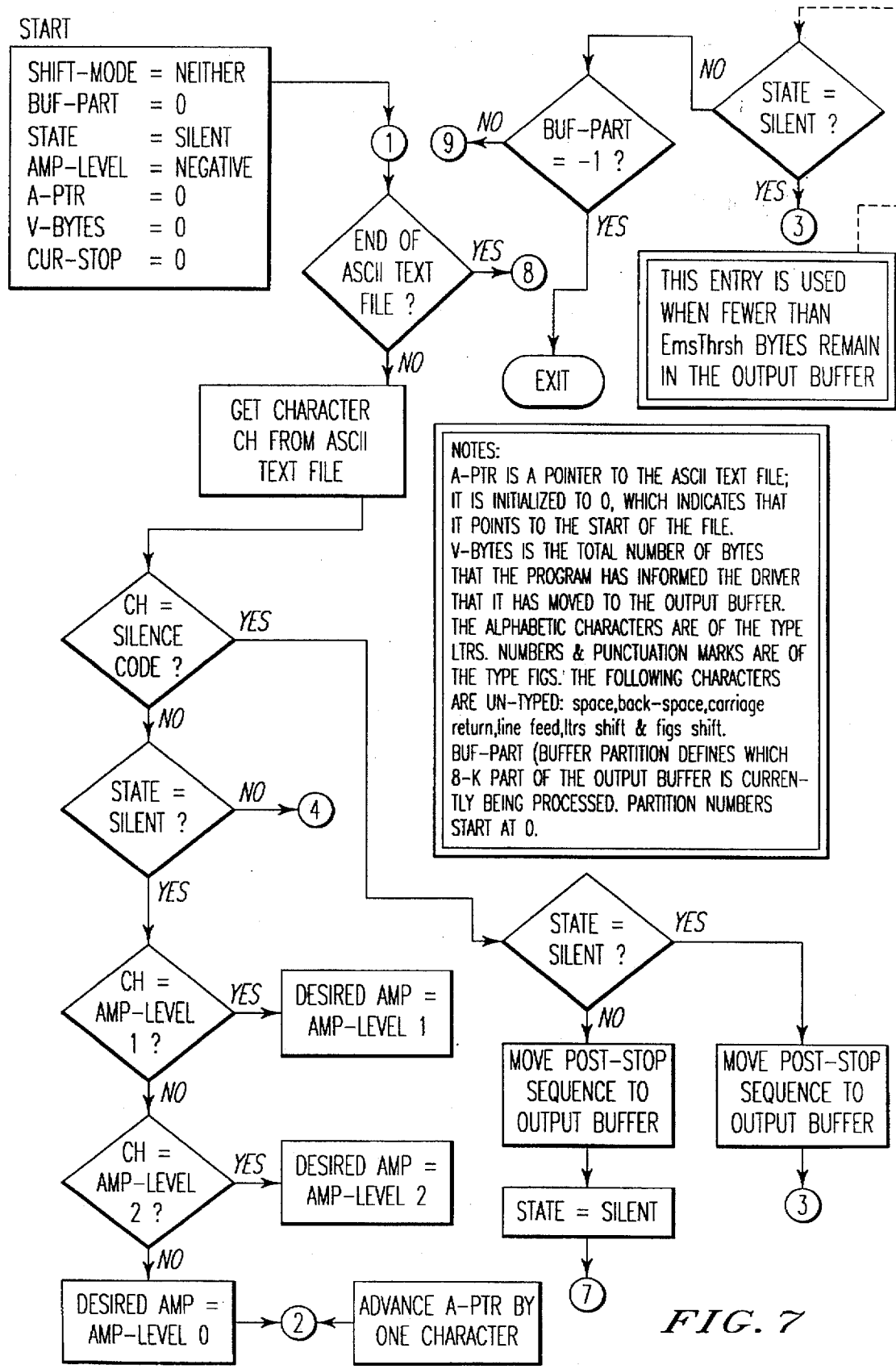
Figure 8:
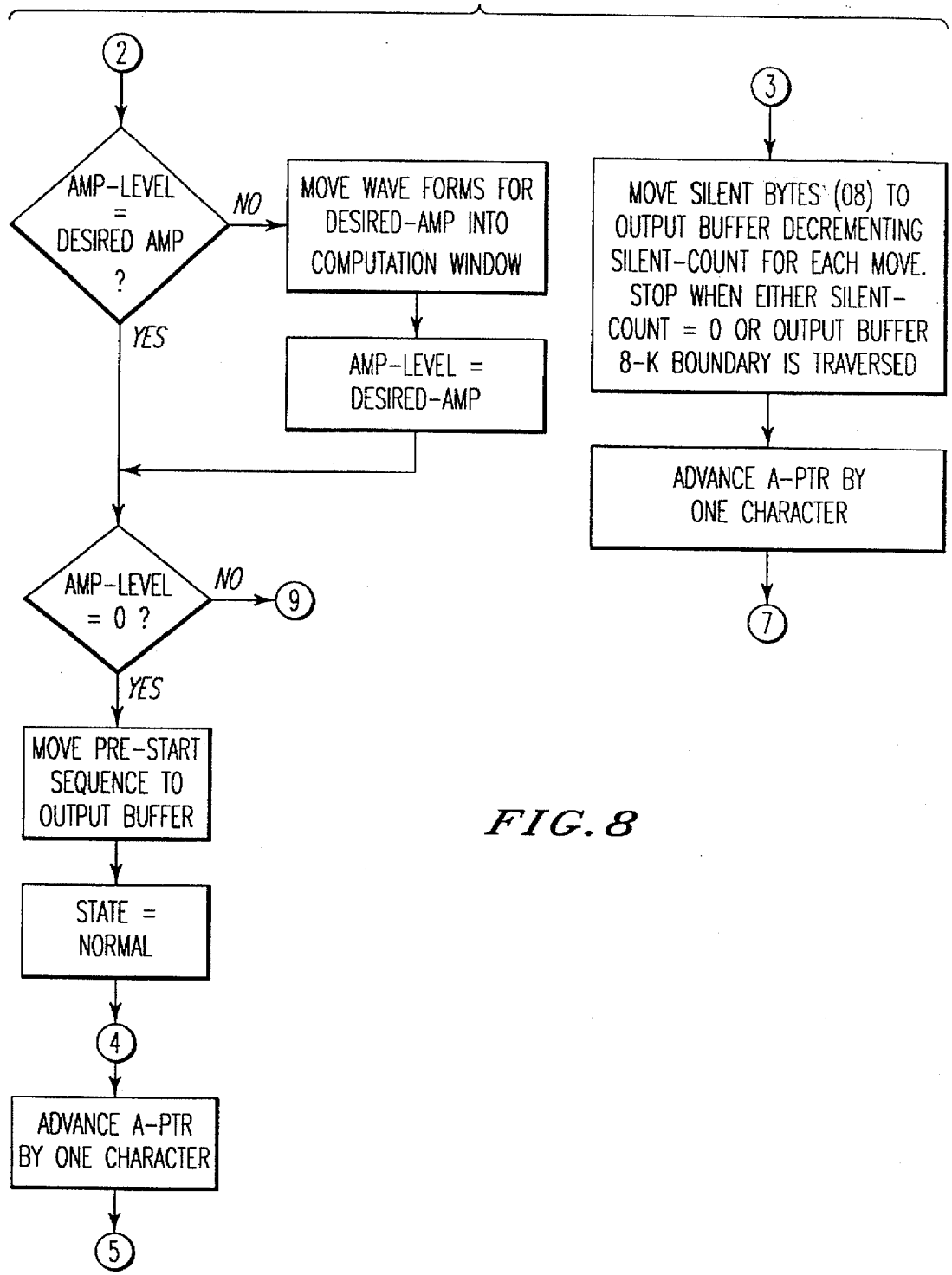
Figure 9:
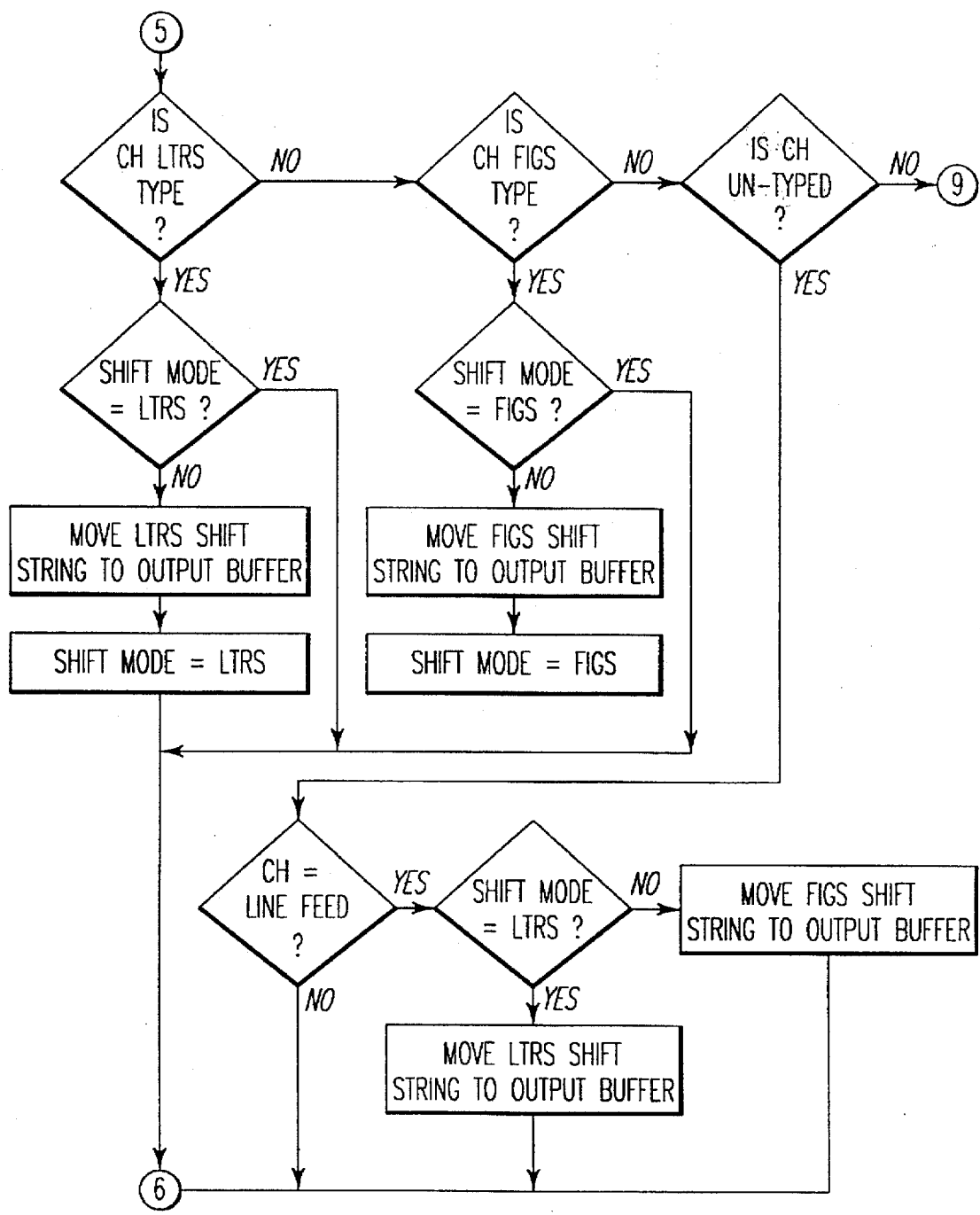
Figure 10:
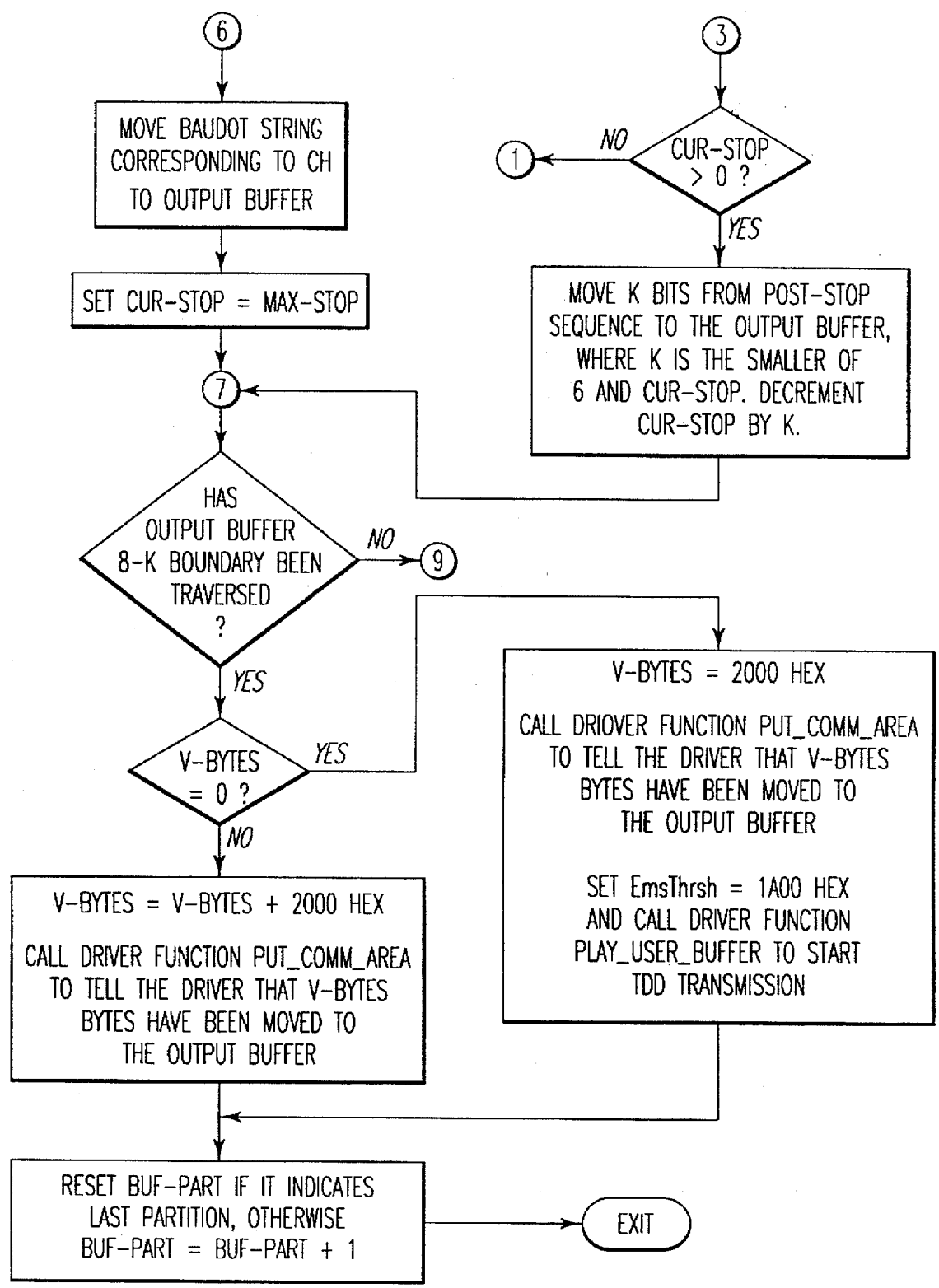
Figure 11:
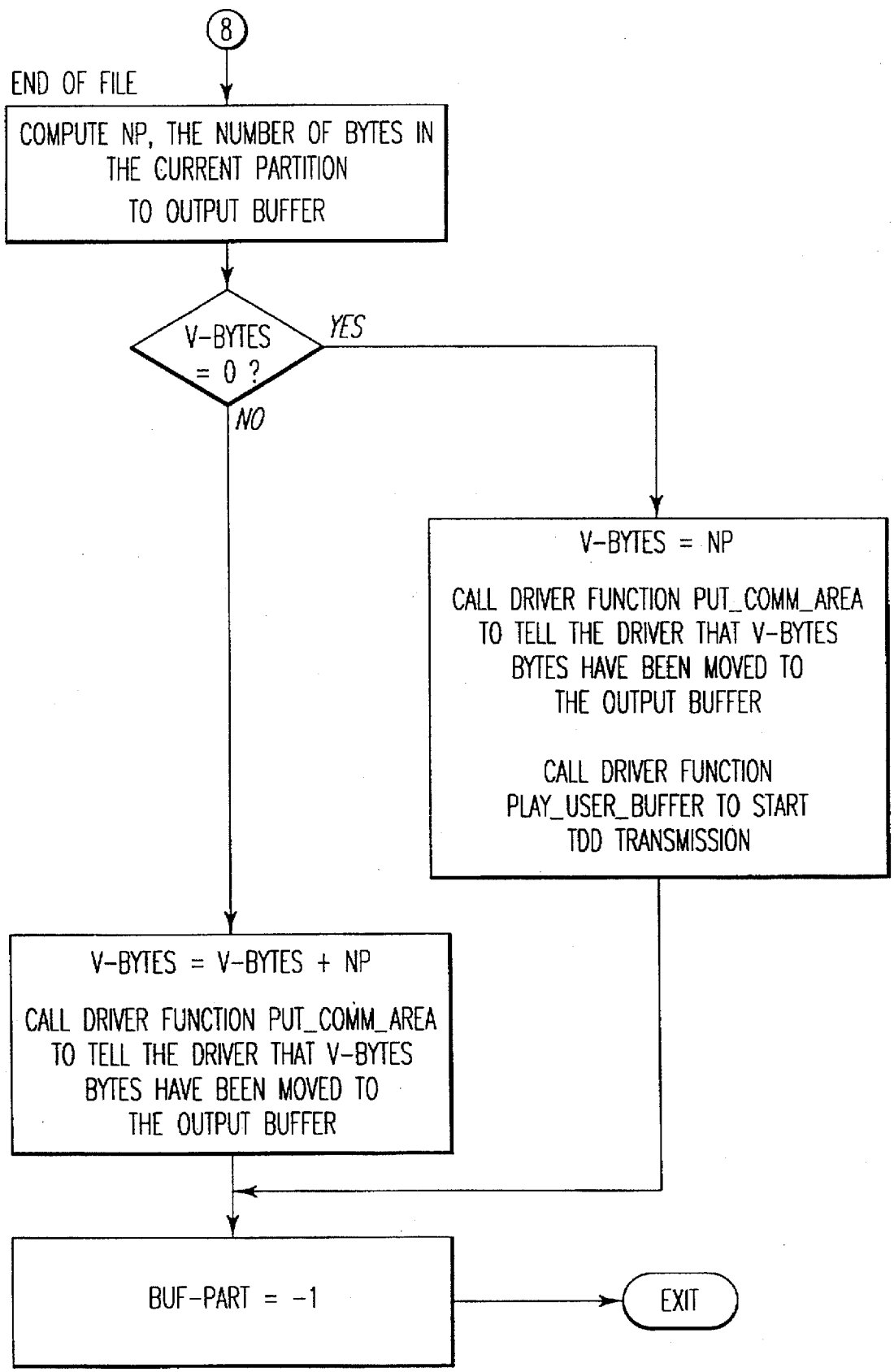

A flow chart for generating the Pre-Start sequence is shown in FIG. 3. A flow chart for the Start bit is shown in FIG. 4. A flow chart for the Data and Stop bits is shown in FIG. 5. A flow chart for the Post-Stop sequence is shown in FIG. 6.

M. Transmission of TDD text.

A flow chart depicting the transmission of TDD text is shown in FIGS. 7 through 11.

The TDD characters that may be transmitted are limited to the Baudot character set. Although there are only 32 different character codes, 56 different characters may be sent by employing two shift modes (LTRS and FIGS). In Baudot code all letters are upper case.

There are 256 different ASCII characters (including the extended ASCII set). The following ASCII to Baudot conversion has been employed in the application of the invention.

1. Characters that have defined Baudot equivalents are converted to those equivalents.

2. Lower case letters are converted to the Baudot equivalent of the corresponding upper case letter.

3. The following ASCII characters are used as control codes.

code 254 (■): silence code code 224 (α): amplitude level 1 code 225 (β): amplitude level 2

Control codes are not transmitted.

4. Characters which are not control codes, and which cannot be converted according to rules 1 and 2 above are transmitted as spaces.

N. Control Codes and Transmit States.

In the implementation of the invention there are two transmit states: NORMAL and SILENT. The state is SILENT at the start of the transmission or after processing the silence control code. The state changes from SILENT to NORMAL after the pre-start transmission. An amplitude control code is ignored unless it is the first character in the ASCII text file or is the first character following a string of silence control codes. The absence of an amplitude control character either at the beginning of the ASCII text file or after a string of silence control characters, indicates the default amplitude level (level 0). Amplitude level is higher than either level 1 or level 2. A silence control character indicates 1 second of silence (no transmission). However, for an orderly transition from NORMAL to SILENT mode, the last character in the NORMAL mode must be followed by a post-stop transmission. A post-stop transmission is also required after the last character in the ASCII text file.

From the above description it can be seen how ASCII text characters should be converted to an output of bytes to a digital to analog converter. In the implementation of the invention, use has been made of a Voice board manufactured by Dialogic Corporation as well as of a software driver also provided by Dialogic Corporation. This implementation is less efficient than if the application of the invention had been incorporated directly in the driver. The approach taken has, however, considerably simplified the task of implementing the invention.

O. TDD data transmission with Dialogic Voice Board and Driver.

Use is made of 2 Dialogic Voice board Driver Functions.

1. Play__User__Buffer. This function will move data bytes from a circular buffer in Expanded Memory [a form of RAM that can be addressed according to the Lotus-Intel-Microsoft expanded memory specification] to the Voice Board, at a rate determined by the Voice Board. In the implementation the size of that buffer is either 16,384 [4000 hex] bytes or 32,768 [8000 hex] bytes. The driver informs the application program when fewer than EmsThrsh bytes remain in the buffer. The number of bytes remaining equals the number deposited (see next function) less the number moved to the Voice Board. The value of EmsThrsh was selected as 6656 [1A00 hex].

2. Put__Comm__Area. This function is used by the application program to inform the driver of how many bytes the application has deposited in the buffer. This number need not exactly equal the number moved into the buffer. Whereas Play__User__Buffer is called only once per text file, Put__Comm__Area may be called more than once.

The initial step in preparing for the transmission is to select the pre-computed TDD character strings corresponding to the selected amplitude level. The circular buffer is thought of as consisting of separate regions each consisting of 8192 [2000 hex] bytes. The buffer is filled by moving into it character strings of 92 (pre-start), 504 (regular) or 402 (post-stop) bytes. [Silence is handled slightly differently as is described a little later].

As soon as the first 8192 boundary is crossed, the driver is informed through function Put__Comm__Area, that 8192 bytes have been moved to the buffer (although in general more than 8192 have actually been moved). Transmission is started by calling function Play__User__Buffer.

The application program then proceeds with its other tasks until informed by the driver that fewer than EmsThrsh bytes remain in the buffer. The buffer is then filled until the next 8192 byte boundary is crossed and again the driver is informed, through Put__Comm__Area, that 8192 more bytes have been added to the buffer.

This process is continued until the end of the ASCII text file is reached. The last character string moved to the buffer corresponds to post-stop. This time the driver is accurately informed, through Put__Comm__Area, how many bytes have been moved to the buffer.

Note that a single ASCII character may, in addition to the byte string corresponding to the ASCII character, cause a pre-start byte string and a shift (FIGS or LTRS) byte string to be transferred to the circular buffer.

Silence is handled as follows. One second of silence corresponds to a string of 3027 bytes with the value 8. (Note that 3027 is half the digitization rate). A variable, Silence__count, for keeping track of output silence is stored in RAM. When a silence code is encountered in the ASCII text file Silence__count is set to 3027. If the transmission state is NORMAL a post-stop string is moved to the circular buffer and the transmission state is changed to SILENT. The regular transfer of character strings to the circular buffer is suspended until all 3027 bytes have been transferred to the buffer. Note that if at any point of the transfer one of the 8192 byte boundaries is traversed, then the transfer is suspended until after the driver has again informed the applications program that fewer than EmsThrsh bytes remain in the circular buffer.

The transmission rate per character is reduced by following normal character transmission with a number of bits from the post-stop sequence. The number of such bits is MAX_STOP. If MAX_STOP=0 then there is no reduction in the transmission rate. As MAX_STOP becomes larger, however, the transmission rate will be reduced.

The value for MAX_STOP can be set interactively by the TDD user. For example, a test message may advise the user that the message is being transmitted at a given rate and that a different rate can be selected by activating a defined key on the TDD terminal. For a nominal digitization rate of 6053.22 Hz, transmission rates of 6, 5, 4, 3, 2, or 1 characters per second correspond to respective MAX STOP values of 0, 2, 4, 8, 15, and 38.

Conversion of TDD Signals to ASCII Signals

The manner in which the TDD signals received from the TDD device 10 are converted to ASCII signal will now be described in detail.

The apparatus of the invention converts a teletype wave form to Baudot characters and then to ASCII characters without the need for a hardware frequency detector. The TDD teletype transmission may be in one of three states: signal transmission at Mark frequency (nominally 1400 HZ), signal transmission at Space frequency (nominally 1800 Hz), and no transmission (nominally zero amplitude).

It is comparatively easy to determine the state of the transmission after it has been digitized, but before data compression. Transmission at Mark or Space frequency is generally loud enough such that it is easy to distinguish between transmissions at those frequencies and a transmission at a nominally zero amplitude. Distinguishing between Mark and Space frequencies can be accomplished by counting the number of signal zero crossings in a given sampling period.

In the case of the Dialogic Voice Board, which has been used in Applicant's implementation of the invention, ADPCM data compression and de-compression is done by a dedicated chip on the voice board. Data transmitted to and from the (personal computer) host is always in compressed ADPCM format. The three transmission states are distinguished when the data is in compressed ADPCM format without re-constructing the original wave form. The computations are therefore very fast, which is very important in an environment where several TDD transmissions may be received concurrently.

A. Estimating frequency of ADPCM sine wave.

Each 4 bits of the compressed ADPCM data represents an increment to the voltage representing the wave. If the increment is positive, then the slope is positive. If it is negative, then the slope is negative. Since the slope changes sign twice per cycle, it follows that the number of changes of slope in a given time period equals twice the period times the frequency (in Hertz):

$$C_{ZERO} = 2 * F * T$$

where $C_{ZERO}$ is the number of zero crossings [changes in the sign of the slope], F the frequency and T the time period. Of the 4 data bits, the leading bit is the sign bit. In order that the slope not change sign twice between samples the sampling rate must be at least twice the highest expected frequency.

B. Measurement Interval.

In selecting a measurement interval it must be remembered that the start bit in a TDD transmission is a synchronization bit; the data bits follow at intervals of (nominally) 22 ms. An interval of approximately one quarter of 22 ms has been found to be a good compromise between speed and accuracy. The actual number is expressed as the number of data bytes to process. Denoting that number by $Q_1$ we calculate $$Q_1 = [0.222 * D/8]_r$$

where D is the digitization rate and $[\ ]_r$ denotes "rounded to the nearest integer". Note that digitization rate is the same as sampling rate and that there are 2 samples per 8-bit data byte. Denoting the interval corresponding to $Q_1$ by $T_1$ we calculate $$T_1 = Q_1 * 2/D$$

C. Start and Data bit Interval.

We calculate $Q_4$, the approximate number of bytes per start or data bit, as $$Q_4 = [0.222 * D/2]_r.$$

Denoting the interval corresponding to $Q_r$ by $T_4$ we calculate $$T_4 = Q_4 * 2/D.$$

D. The number of Zero Crossings in the Measurement Interval.

$$C_{ZERO-MARK} = 2 * 1400\ Hz * T_1$$

$$C_{ZERO-SPACE} = 2 * 1800\ Hz * T_1$$

Selection of an integer $Z_{Space}$ allows differentiation between Mark and Space frequencies. If the number of zero crossings is less than $Z_{SPACE}$ then the frequency is labelled Mark, otherwise it is labelled Space. $Z_{SPACE}$ is computed as $$Z_{SPACE} = [(C_{ZERO-MARK} + C_{ZERO-SPACE})/2]_r.$$

For a digitization rate D=6053.22 Hz, we have
$Q_1 = 17$, $Q_4 = 67$,
$T_1 = 5.617$ ms, $T_4 = 22.137$ ms,
$C_{ZERO-MARK} = 15.73$
$C_{ZERO-SPACE} = 20.22$
$Z_{SPACE} = 18$.

E. Distinguishing between Signal and no Signal.

The original wave form may be reconstructed through the use of the known ADPCM de-compression algorithm. The difference in amplitudes between signal and no signal is so large as not to present a problem in determining whether or not the waveform represents a signal. Re-construction of the wave form is, however, rather time consuming. A simpler approach is now described.

The step pointer used in the ADPCM compression and decompression provides a good guide to the wave form amplitude. When a signal is present, the step pointer is either at its maximum value, or else very close to it. In the application of the invention a step pointer threshold value, $P_{THR}$, of 40 has been used. The maximum value of the step pointer is 49 in accordance with the algorithm for ADPCM data compression. ADPCM compression and de-compression use the same algorithm for step pointer calculation and that has been previously been described in the context of ASCII to TDD conversion.

Figure 12:
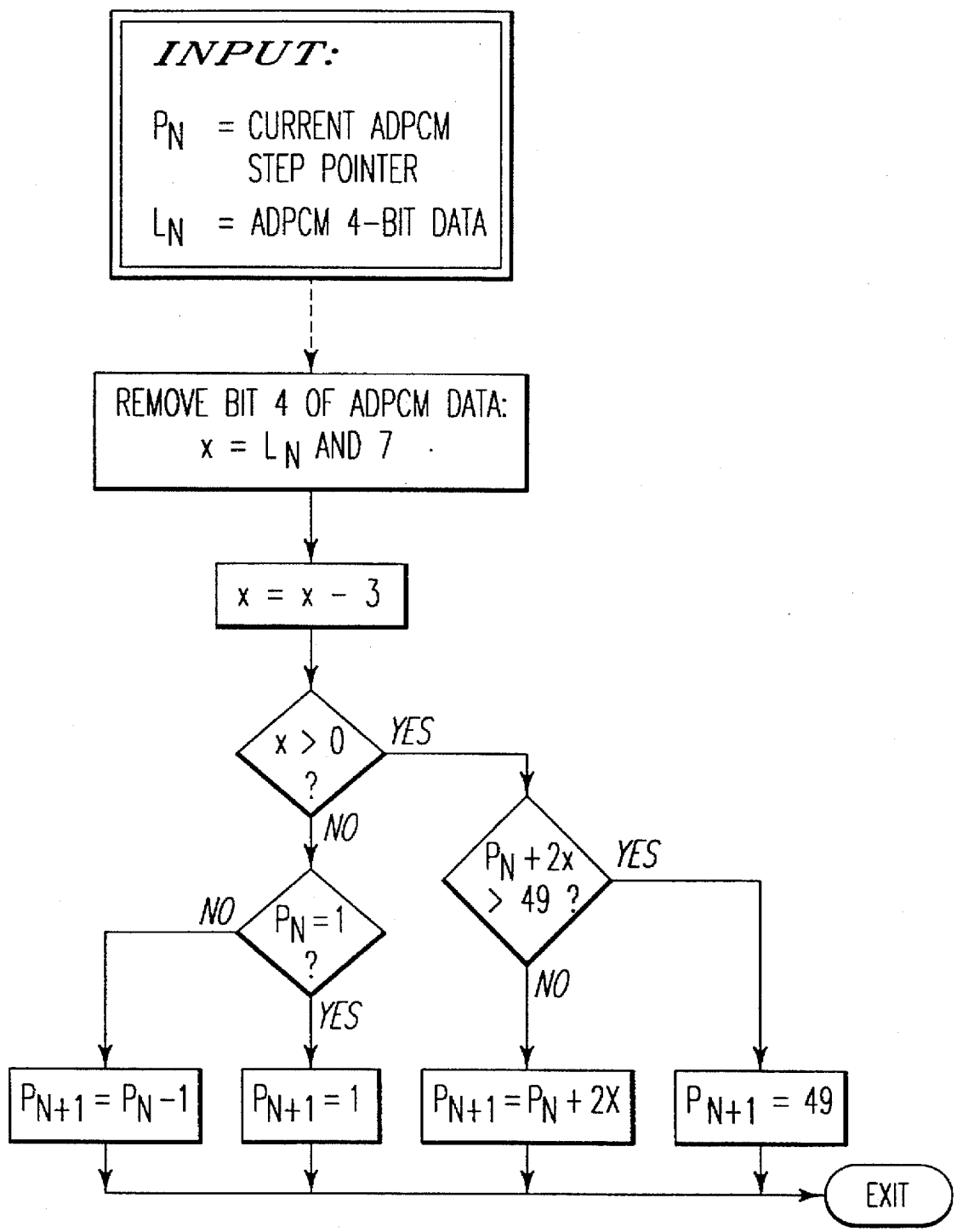

FIG. 12 is a flow chart for the iterative computation of the step pointer based on the stored 4-bit ADPCM data. Note that the computations are equivalent to those previously described for ASCII to TDD conversion.

A different approach to estimating signal strength is based on the magnitude of the ADPCM data. This method uses either the 3 least significant bits or just the third bit. The method based on the latter selection gives somewhat better result. The method is computationally faster than that based on the ADPCM Step pointer, but it is less reliable.

F. Estimating Mark, Space and No Signal.

Figure 13:
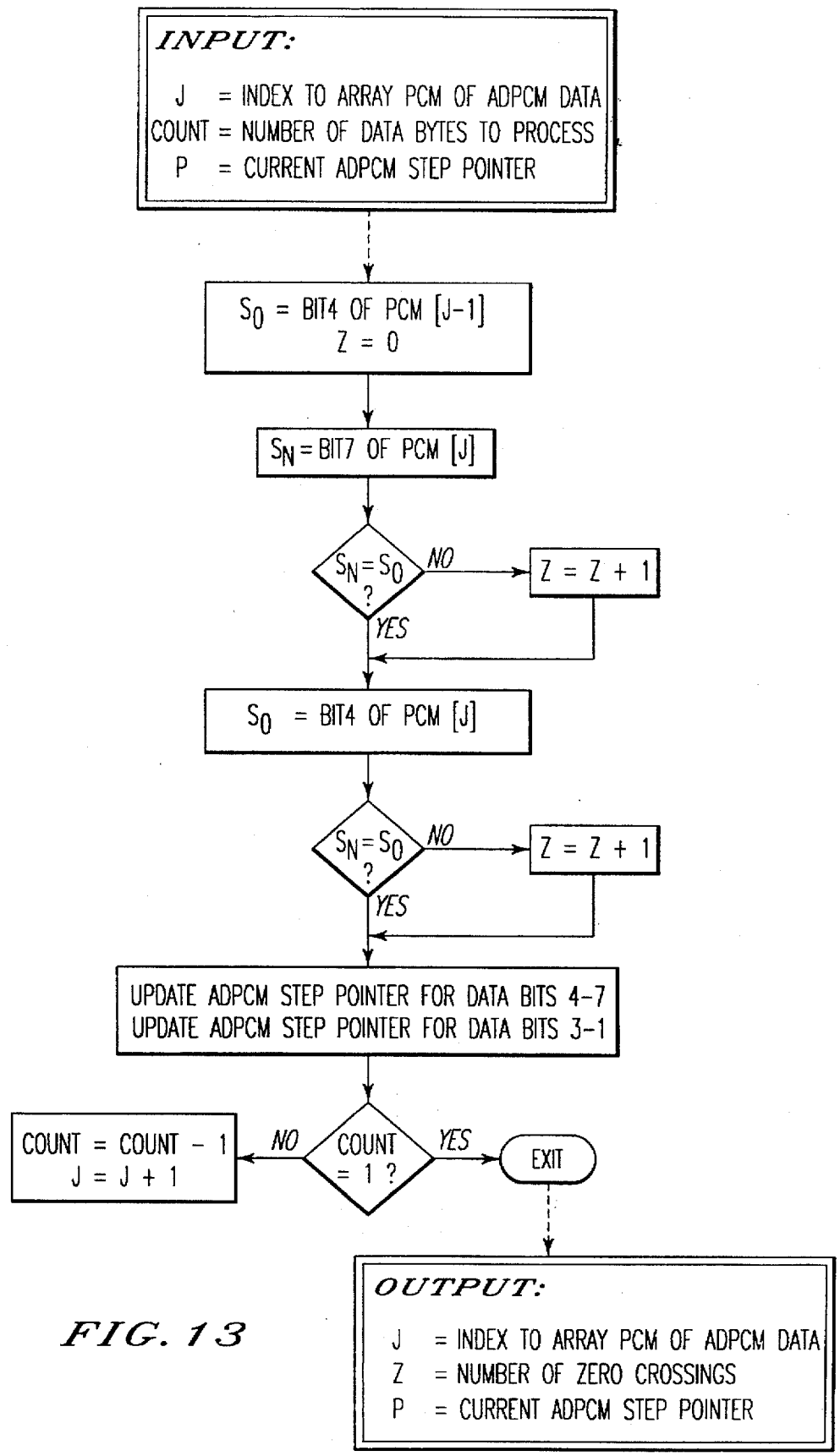
Figure 14:
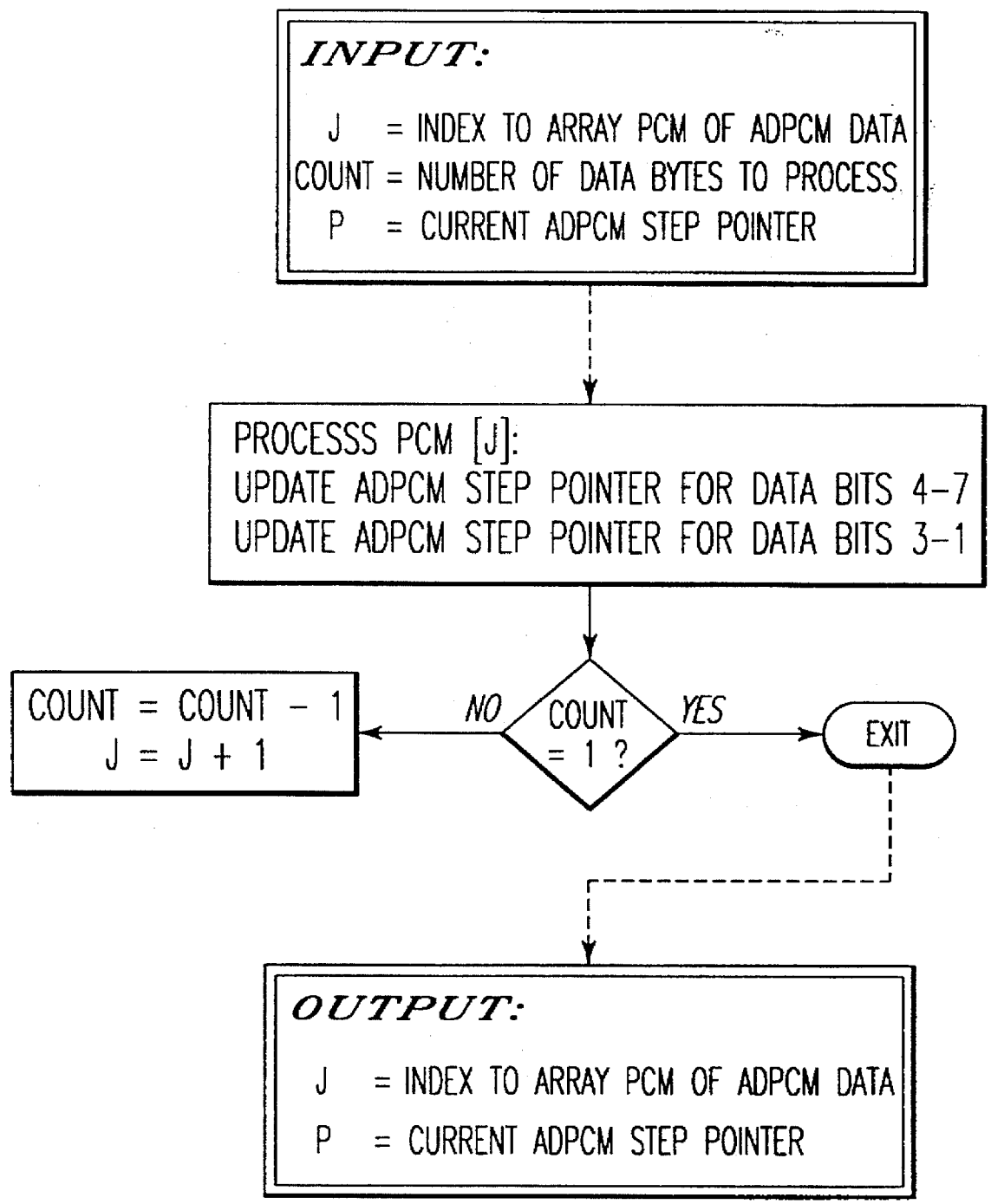

FIG. 13 shows how a distinction is made between No signal, a Mark signal and a Space signal. The sampled data for this is collected for about 5.5 ms. FIG. 14 shows a procedure for advancing the ADPCM step pointer without counting zero crossings. The computations in FIGS. 13 and 14 are quite simple, but they are repeated a very large number of times. For that reason optimization of the corresponding procedures has a significant effect on the number of TDD callers that can be handled simultaneously by a single computer.

G. Detecting Baudot Characters.

Figure 15:
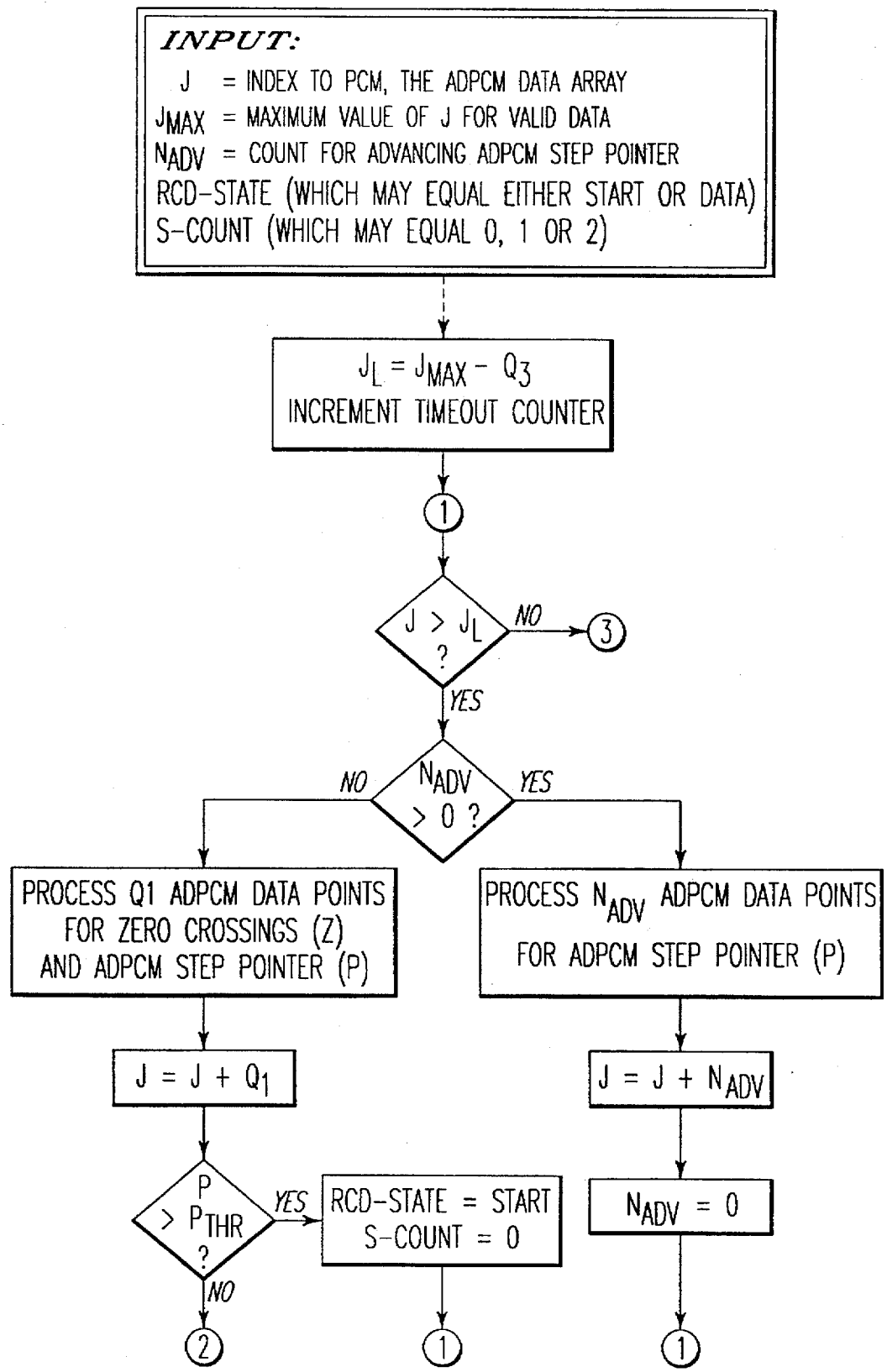
Figure 16:
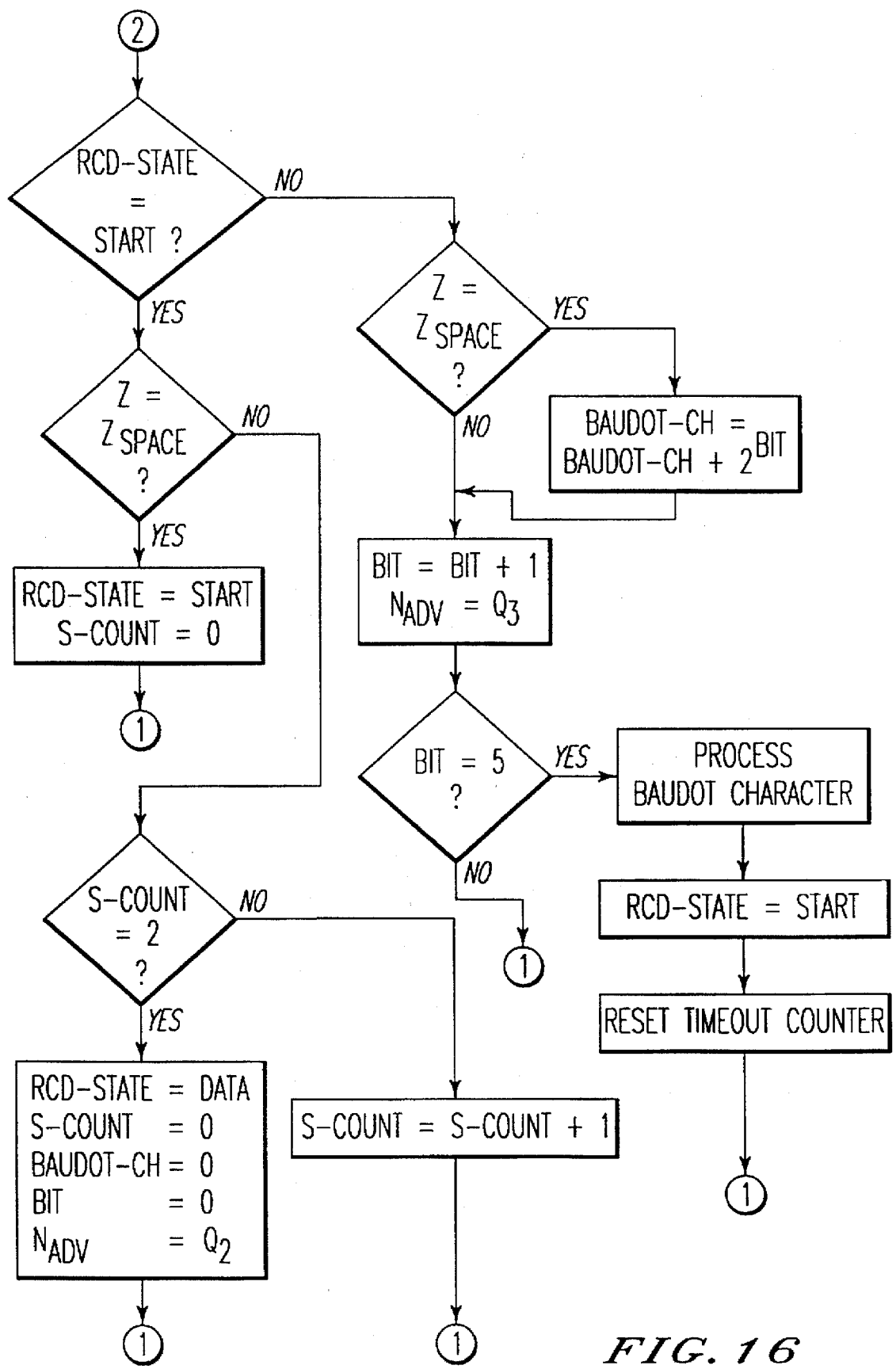
Figure 17:
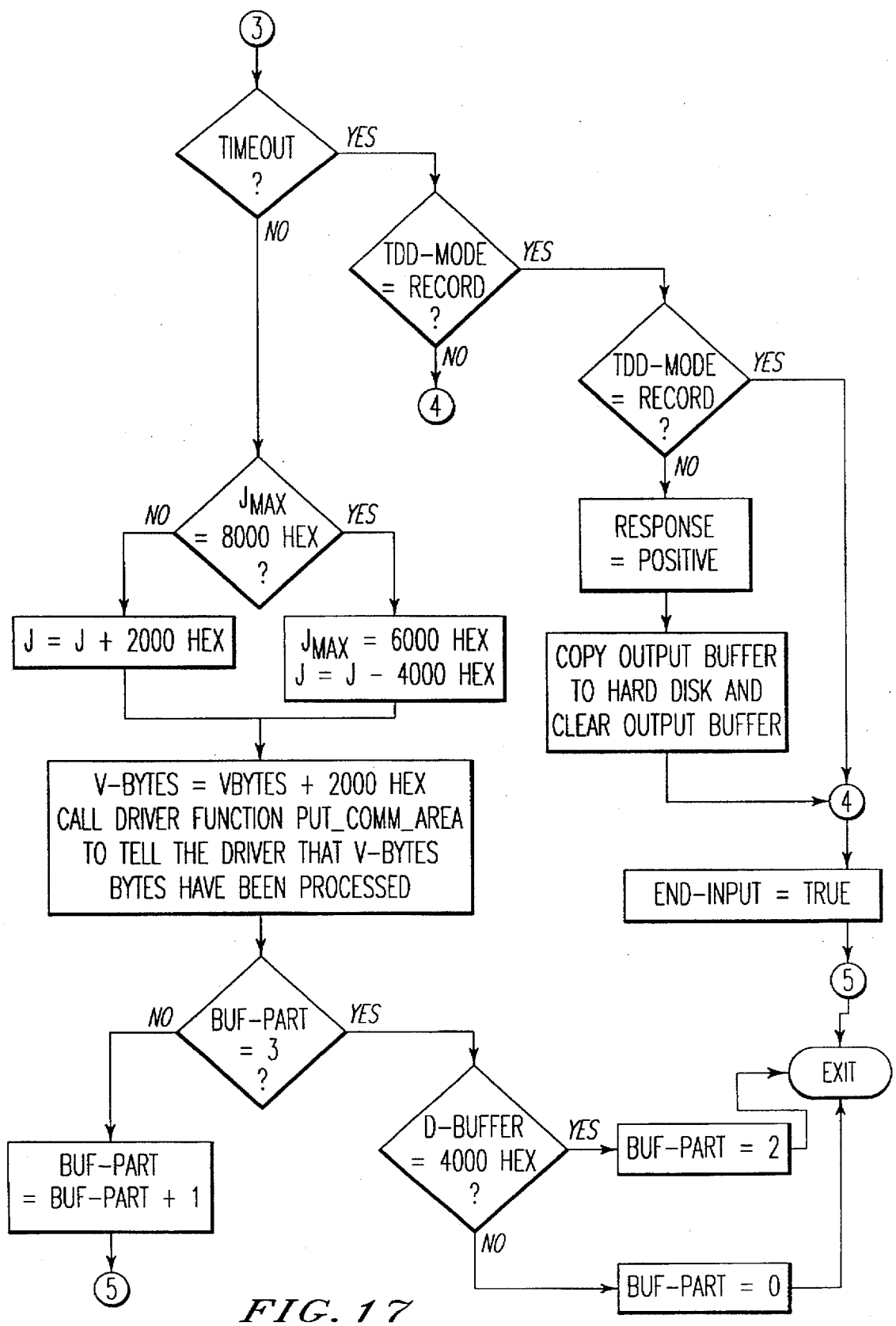
Figure 18:
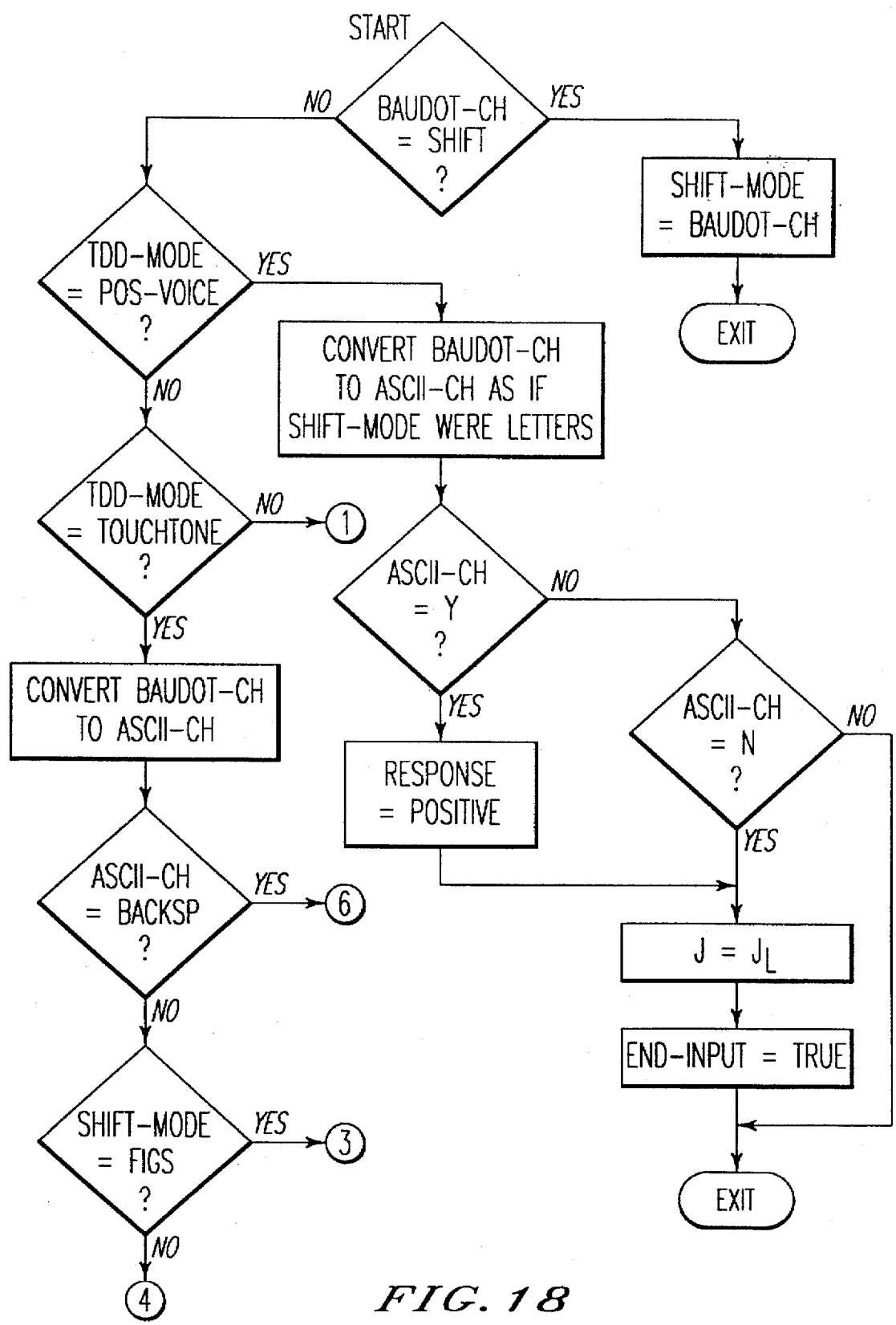
Figure 19:
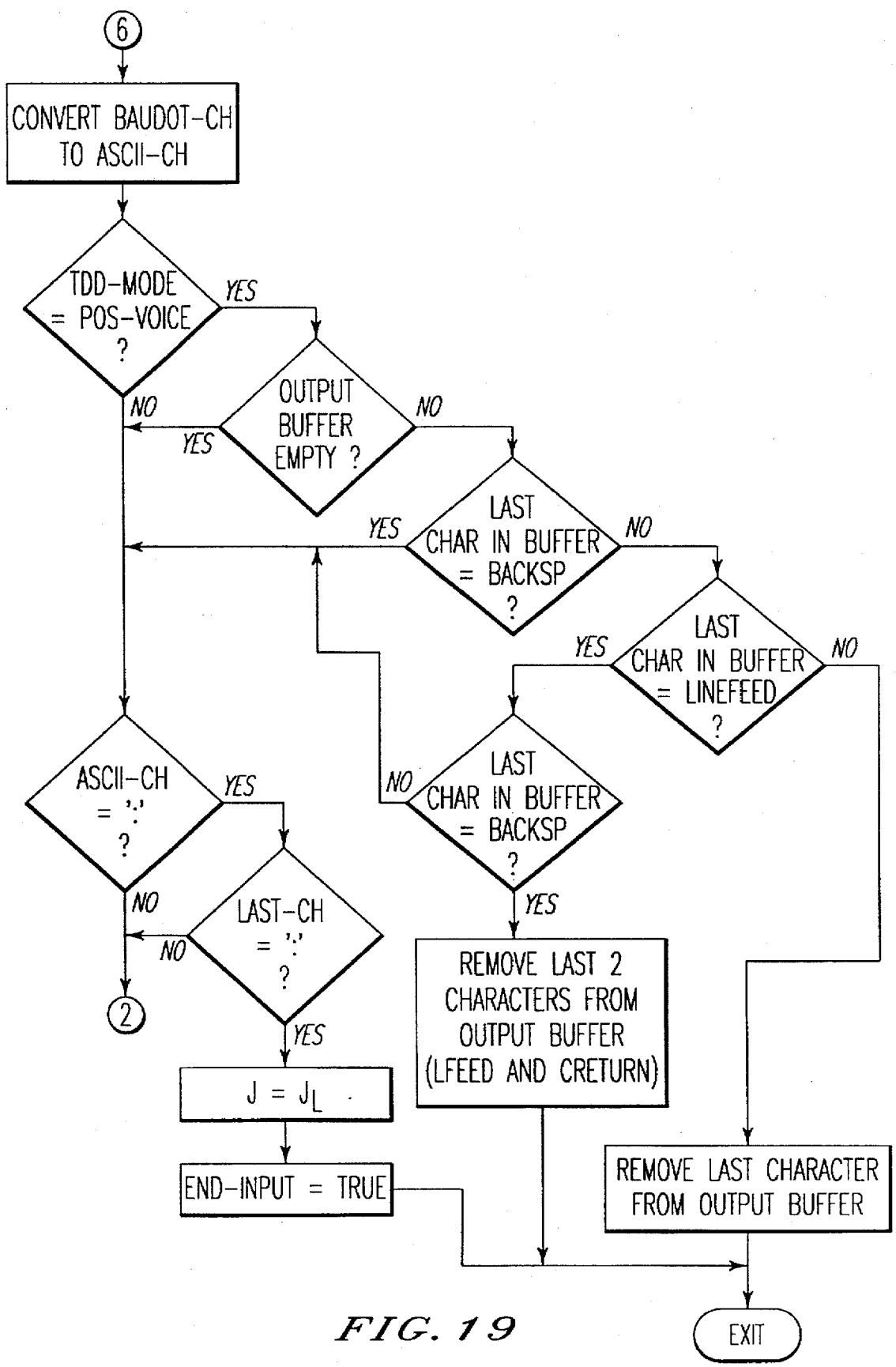
Figure 20:
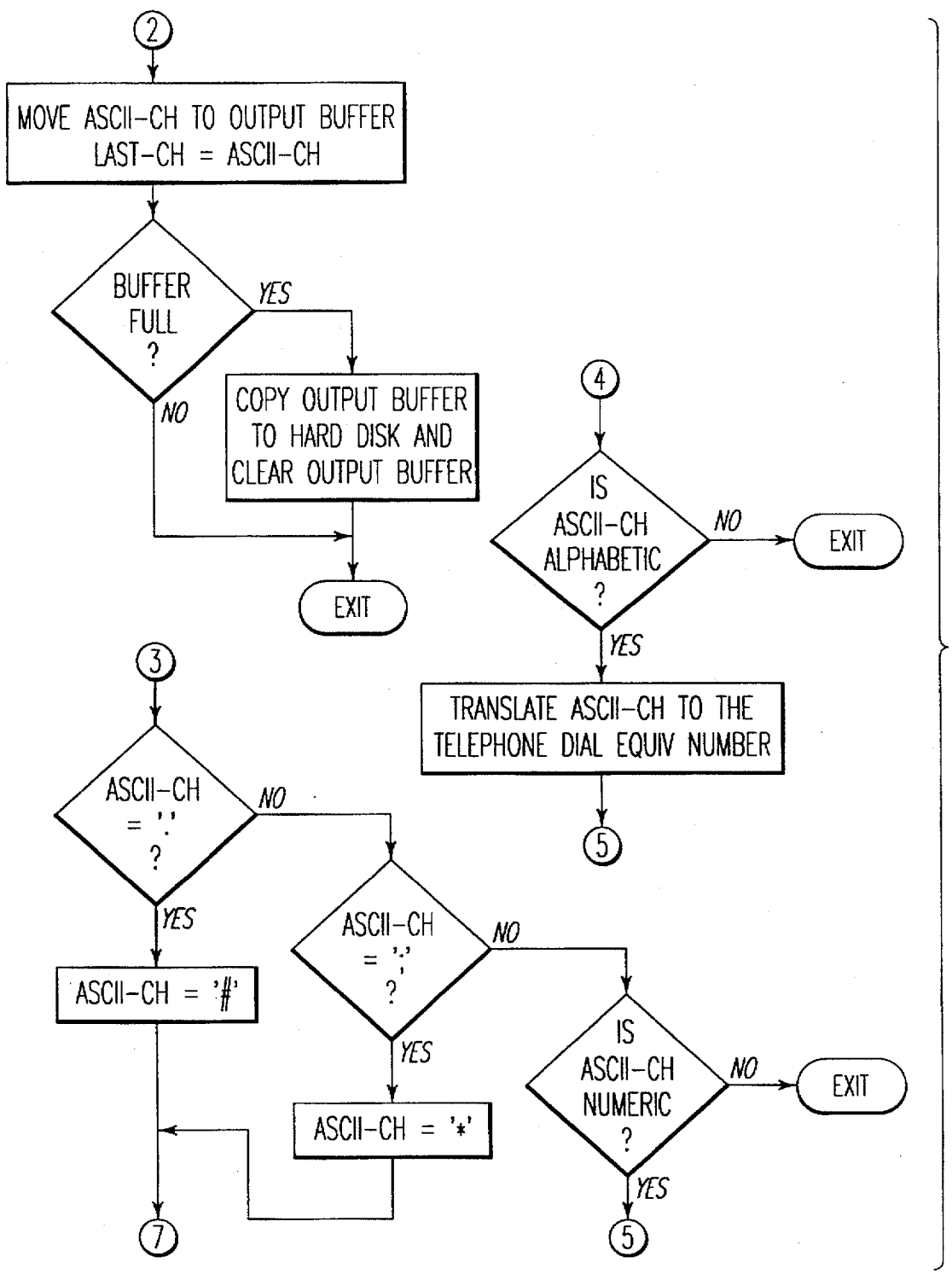
Figure 21:
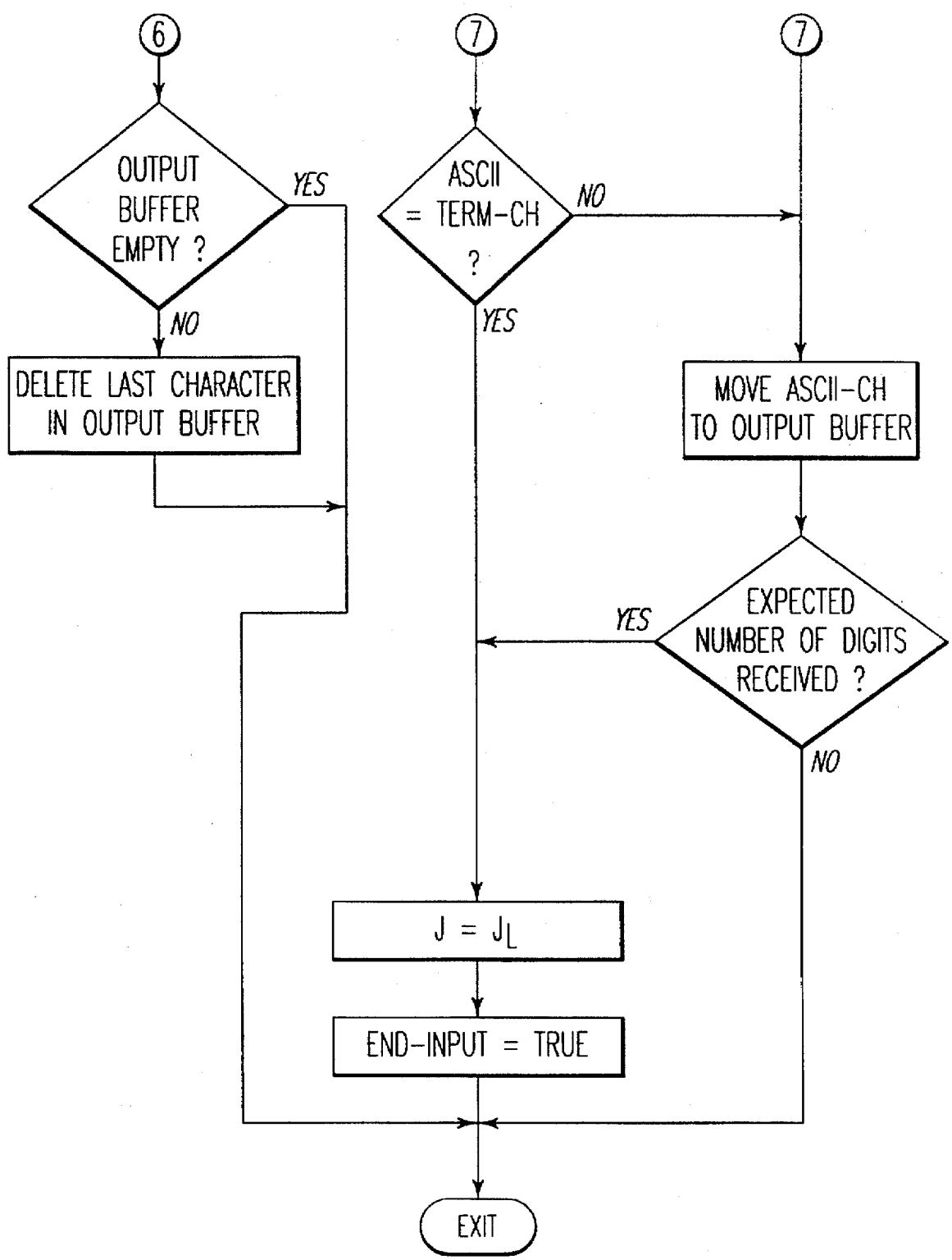

FIGS. 15 through 17 are flow charts describing the processing of data in the input buffer. These flow charts show how knowing whether the signal is Mark or Space is used to detect the start and data bits of a Baudot character.

H. Processing Baudot Characters.

Note that if Touch Tone signals are received and detected while processing TDD input, then the program will abandon the processing of the TDD input, and proceed with the processing of the Touch Tone input in the same way as in non-ASCII languages. This feature is not shown in the flow charts.

The processing of Baudot characters is shown in FIGS. 18 through 21. In order to take advantage of existing voice processing systems, the Baudot characters are processed in three different emulation modes: Touch Tone, positive voice and record.

Touch Tone Emulation. Numeric characters and backspace have their usual meaning. The semi-colon (';') is converted to star ('*'), and the period ('.') to pound ('#'). Letters are equated to numbers as on a telephone dial; 'Q' and 'Z' which do not appear on a dial are both converted to '1'. All other characters are ignored.

Positive Voice Emulation. In a voice processing system, such as the system manufactured by Microlog corporation, the positive voice feature is used by hearing people who do not have a Touch Tone phone. If noise exceeding a predetermined duration is detected, then the response is deemed to be positive, otherwise it is negative. In positive voice emulation, Baudot characters are converted to ASCII as if they were in letter'shift mode. A 'Y' is considered positive, an 'N' negative. All other characters are ignored.

Record Emulation. This, strictly speaking, is not an emulation mode. Received characters are converted from Baudot to ASCII according to the Standard formula. A recording may be terminated either by a timeout or after the receipt of two consecutive semi-colons. Note that timeout is based on non-receipt of characters rather than on silence.

I. Reception of characters using Dialogic Voice Board and Driver.

Use is made of 2 voice board driver functions.

1. Record_User_Buffer. This function moves to a circular buffer in Expanded Memory [a form of RAM that can be addressed according to the Lotus-Intel-Microsoft expanded memory specification] data, in blocks of 512 bytes, as it is received and processed by the Voice Board. In the preferred implementation, the size of that buffer is either 16,384 [4000 hex] bytes or 32,768 [8000 hex] bytes. The driver informs the application program when more than EmsThrsh unprocessed bytes are in the buffer. The number of unprocessed bytes equals the number processed (see the next function) less the number received from the voice board. The value of EmsThrsh was selected to equal the size of the buffer (in bytes) less 8192 [2000 hex].

2. Put_Comm_Area. This function is used by the application program to inform the driver of how many how many bytes the application has processed in the buffer. This number need not exactly equal the number actually processed. Whereas Record_User_Buffer is called only once for each input, Put_Comm_Area may be called more than once.

Figure 22:
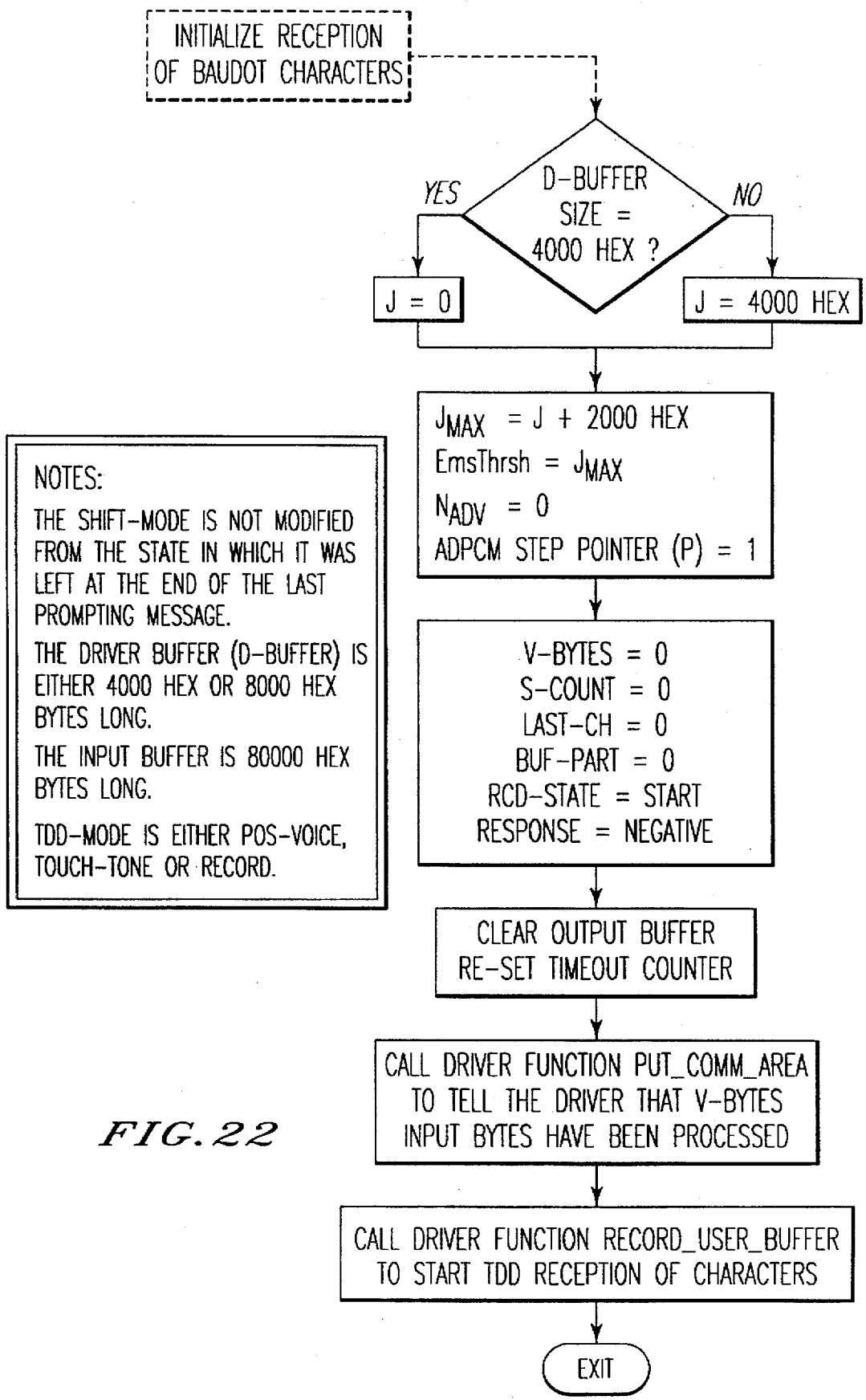
Figure 23:
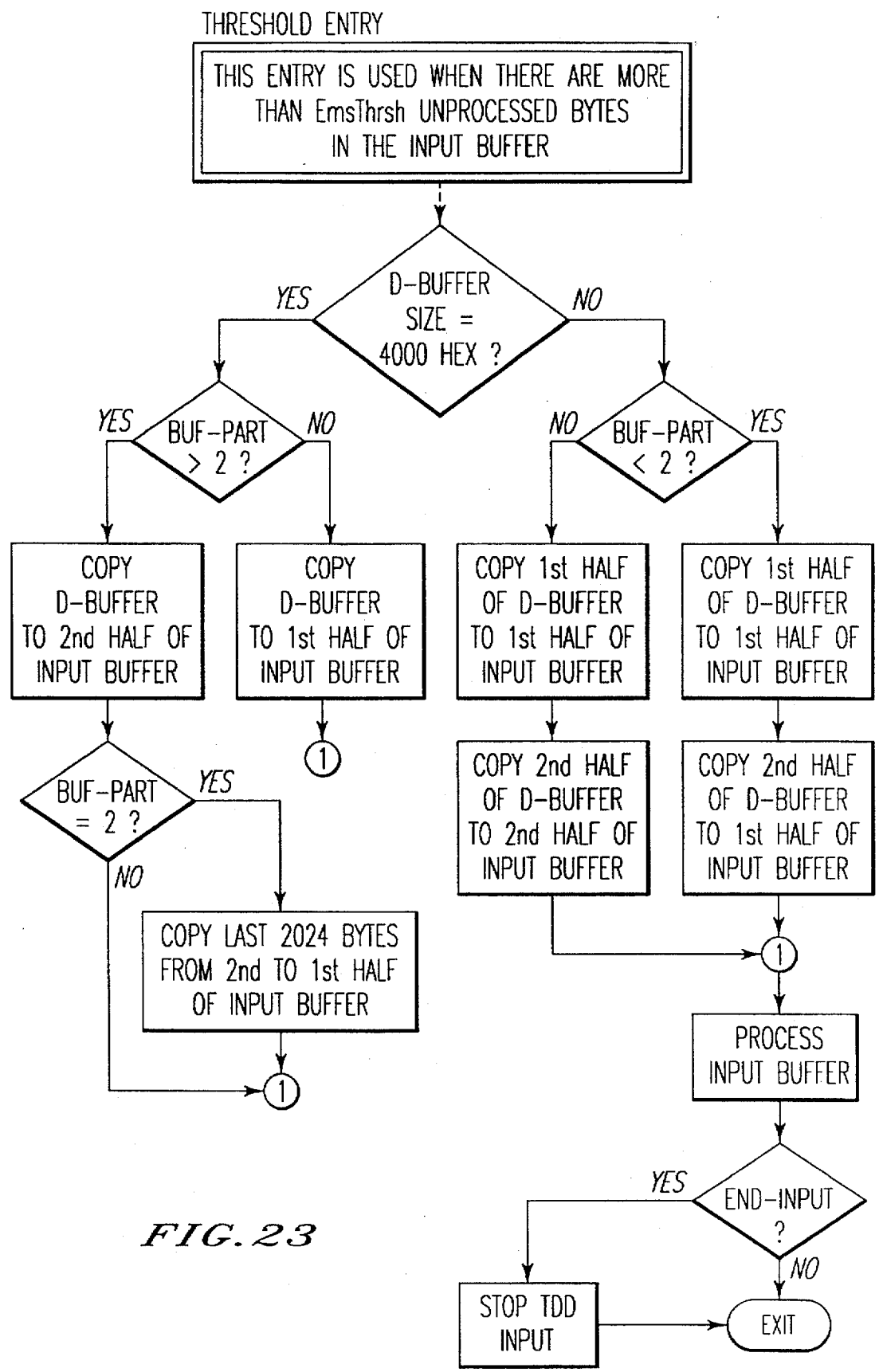
Figure 24:
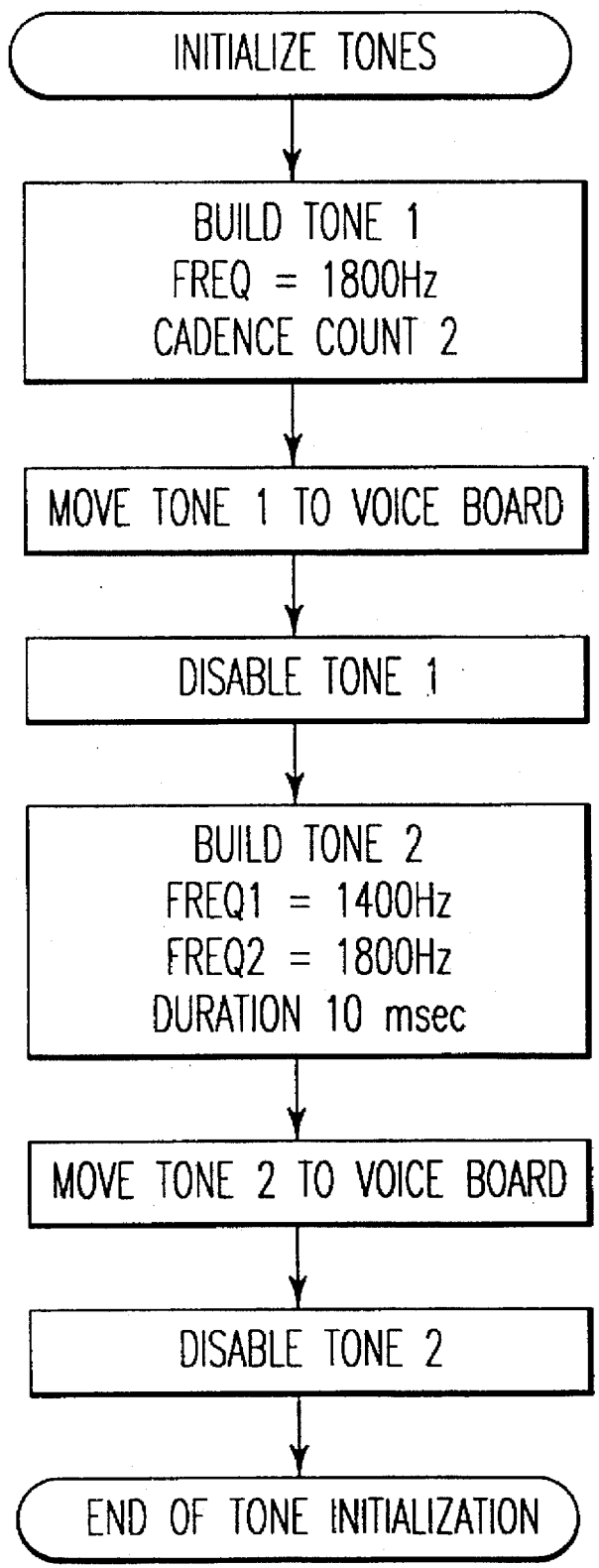
Figure 25:
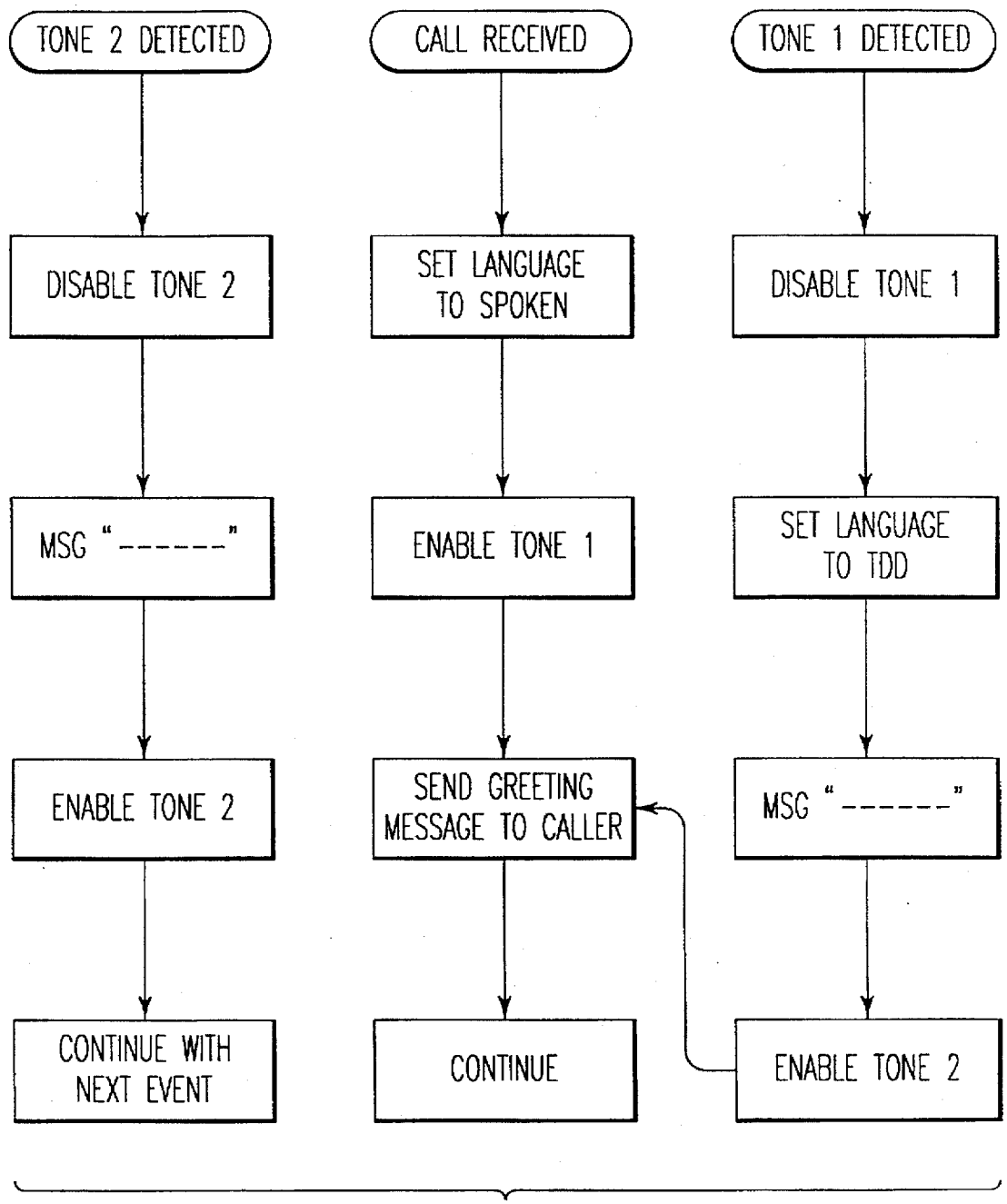

A flow chart for the reception of TDD characters is given in FIGS. 22 and 23.

J. Termination of recording.

The termination of a recording after a timeout is shown in FIG. 17. A recording may also be terminated by the caller hanging up before a timeout occurs. This is not shown on the flow charts. The action, however, is similar to that of a timeout: if the output buffer is not empty, record its contents to the hard disk, and then stop the TDD input.

It will be appreciated that a unique system for communication of messages has been described. Modifications within the scope of the appended claims will be apparent to those of skill in the art.

We claim:

1. A method for converting message signals stored in ASCII format comprising providing a lookup table for converting an ASCII character code to a Baudot character code, storing digital waveforms, each of said digital waveforms comprising a plurality of digital samples representing the analog waveform of a respective character in analog Baudot tone code, converting said message signals by said lookup table to Baudot signals, and recalling digital waveforms corresponding to said Baudot signals.

2. A method for converting message signal stored in ASCII format comprising providing a lookup table for converting an ASCII character code to a Baudot character code, storing digital waveforms, each of said digital waveforms representing a respective character in Baudot code, converting said message signals by said lookup table to Baudot signals, recalling digital waveforms corresponding to said Baudot signals; and supplying said digital waveforms to a digital to analog converter to produce analog signals.

3. A method according to claim 2, wherein said analog signals are for a telecommunications device for the deaf.

4. A method for converting message signals stored in ASCII format comprising providing a lookup table for converting an ASCII character code to a Baudot character code, storing digital waveforms, each of said digital waveforms representing a respective character in Baudot code, converting said message signals by said lookup table to Baudot signals, recalling digital waveforms corresponding to said Baudot signals, wherein the step of storing said digital waveforms comprises storing a plurality of digital samples of each of said Baudot code characters, said digital samples being characterized by a sampling rate at least twice as great as the highest frequency of said analog signals.

5. A method for converting message signals stored in ASCII format comprising providing a lookup table for converting an ASCII character code to a Baudot character code, storing digital waveforms, each of said digital waveforms representing a respective character in Baudot code, converting said message signals by said lookup table to Baudot signals, recalling digital waveforms corresponding to said Baudot signals, wherein the Baudot code characters represented by said digital waveforms each comprise a plurality of information bits having predetermined durations and frequencies, and further comprising the step of selecting said durations and frequencies such that the duration of each of said Baudot code characters is an integral number of cycles at the corresponding frequency.

6. A method according to claim 5, wherein said digital waveforms each comprise a plurality of digital samples of one of said Baudot code characters at a predetermined sampling rate, and wherein the durations and frequencies of said information bits are selected so that there is an integral number of said digital samples for each of said information bits at said predetermined sampling rate.

7. A method for converting message signals stored in ASCII format comprising providing a lookup table for converting an ASCII character code to a Baudot character code, storing digital waveforms, each of said digital waveforms representing a respective character in Baudot code, converting said message signals by said lookup table to Baudot signals, recalling digital waveforms corresponding to said Baudot signals, selectively setting the amplitude of said digital waveforms.

8. A method for converting message signals stored in ASCII format comprising providing a lookup table for converting an ASCII character code to a Baudot character code, storing digital waveforms, each of said digital waveforms representing a respective character in Baudot code, converting said message signals by said lookup table to Baudot signals, recalling digital waveforms corresponding to said Baudot signals, wherein said digital waveforms comprise digital data that has been compressed in accordance with a data compression algorithm, and wherein said digital waveforms are de-compressed in accordance with said algorithm after being recalled.

9. A method for ascertaining information represented by single-frequency analog signals, comprising applying said analog signals to an analog to digital converter to produce digital representations of said analog signals, determining the frequencies of said analog signals by determining from said digital representations the number of occurrences per unit time of a selected characteristic of said signals, and ascertaining from said frequencies said information represented by said analog signals.

10. A method according to claim 9, further comprising correlating the frequencies of said analog signals with character codes.

11. A method according to claim 10, wherein said character codes are in Baudot format.

12. A method according to claim 11, further comprising converting said character codes in Baudot format to character codes in ASCII format and storing said codes in ASCII format.

13. A method according to claim 12, wherein said analog signals are received from a telecommunications device for the deaf.

14. A method according to claim 9, wherein said occurrences of a selected characteristic of said signal comprise reversals in the slope of said signal.

15. A method according to claim 14, wherein said digital representations comprise compressed digital samples of said analog signals, each of said samples including a sign bit, and wherein the step of determining the number of slope reversals per unit time is carried out by determining the number of changes in said sign bit per unit time.

16. A method according to claim 9, further comprising the step of eliminating noise from said analog signals by determining whether the level of said signals exceeds a predetermined threshold value.

17. A method according to claim 9, wherein the step of ascertaining said information is carried out by distinguishing analog signals having a first frequency from analog signals having a second frequency different from said first frequency.

18. A method for determining the presence or absence of an analog signal, comprising applying said analog signal to an analog to digital converter to produce a plurality of digital samples of said analog signal, processing said digital samples using a data compression/decompression algorithm in which a variable step pointer is calculated, and comparing the calculated value of said step pointer with a threshold value to indicated the presence or absence of said analog signal.

19. A method according to claim 18, wherein said analog signal comprises a Baudot format character code.

20. A method according to claim 18, wherein said Baudot format character code is received from a telecommunications device for the deaf.

* * * * *